United States Patent [19]

Konno et al.

[11] Patent Number: 5,148,379
[45] Date of Patent: Sep. 15, 1992

[54] METHOD FOR AUTOMATICALLY GENERATING A SIMULATION PROGRAM FOR A PHYSICAL PHENOMENON GOVERNED BY A PARTIAL DIFFERENTIAL EQUATION, WITH SIMPLIFIED INPUT PROCEDURE AND DEBUG PROCEDURE

[75] Inventors: Chisato Konno, Inagi; Ohata: Tadashi, Higashimurayama; Mitsuyoshi Igai, Hino; Yukio Umetani, Hachioji; Michiru Yamabe, Hino, all of Japan

[73] Assignees: Hitachi Ltd.; Hitachi VLSI Engineering Corporation, both of Tokyo, Japan

[21] Appl. No.: 443,252

[22] Filed: Nov. 30, 1989

[30] Foreign Application Priority Data

Dec. 2, 1988 [JP] Japan ................. 63-304154

[51] Int. Cl.[5] .......................... G06F 15/328
[52] U.S. Cl. ......................... 364/578; 371/19
[58] Field of Search ........... 364/578, 513, 200, 900, 364/702, 704, 521, 191, 192, 193, 194; 371/19

[56] References Cited

U.S. PATENT DOCUMENTS

| | | | |
|---|---|---|---|
| 4,677,587 | 6/1987 | Zemany, Jr. | 364/900 |
| 4,742,473 | 5/1988 | Shugar et al. | 364/578 |
| 4,819,161 | 4/1989 | Konno et al. | 364/900 |
| 4,841,479 | 6/1989 | Tsuji et al. | 364/900 |
| 4,866,663 | 9/1989 | Griffin | 364/578 |
| 4,933,889 | 6/1990 | Meshkat et al. | 364/578 |
| 5,029,119 | 7/1991 | Konno | 364/578 |

OTHER PUBLICATIONS

Malsyma Symbolics TM; Symbolics Inc.; copyright 1987 advertisement in IEEE Spectrum Jul. 1987, p. 51.
Phoenics; CHAM of North America Incorporated; rcvd PTO Jan. 12, 1988.
Konno et al; A high level Programming Language for Numerical Simulation: DEQSOL; IEEE Tokyo Section No. 25(1986) pp. 50-53.

*Primary Examiner*—Parshotam S. Lall
*Assistant Examiner*—Michael Zanelli
*Attorney, Agent, or Firm*—Antonelli, Terry, Stout, Kraus

[57] ABSTRACT

The entry of a problem describing program is assisted by a database or a display screen. An error in numerical calculation of the input problem describing program is automatically checked. A simulation program which interrupts the execution of a process requested by a statement in the problem describing program which a user designates as a break point when the simulation program executes the process is automatically generated. At the time of interruption, the execution status of the simulation is diagnosed upon the user's request.

31 Claims, 36 Drawing Sheets

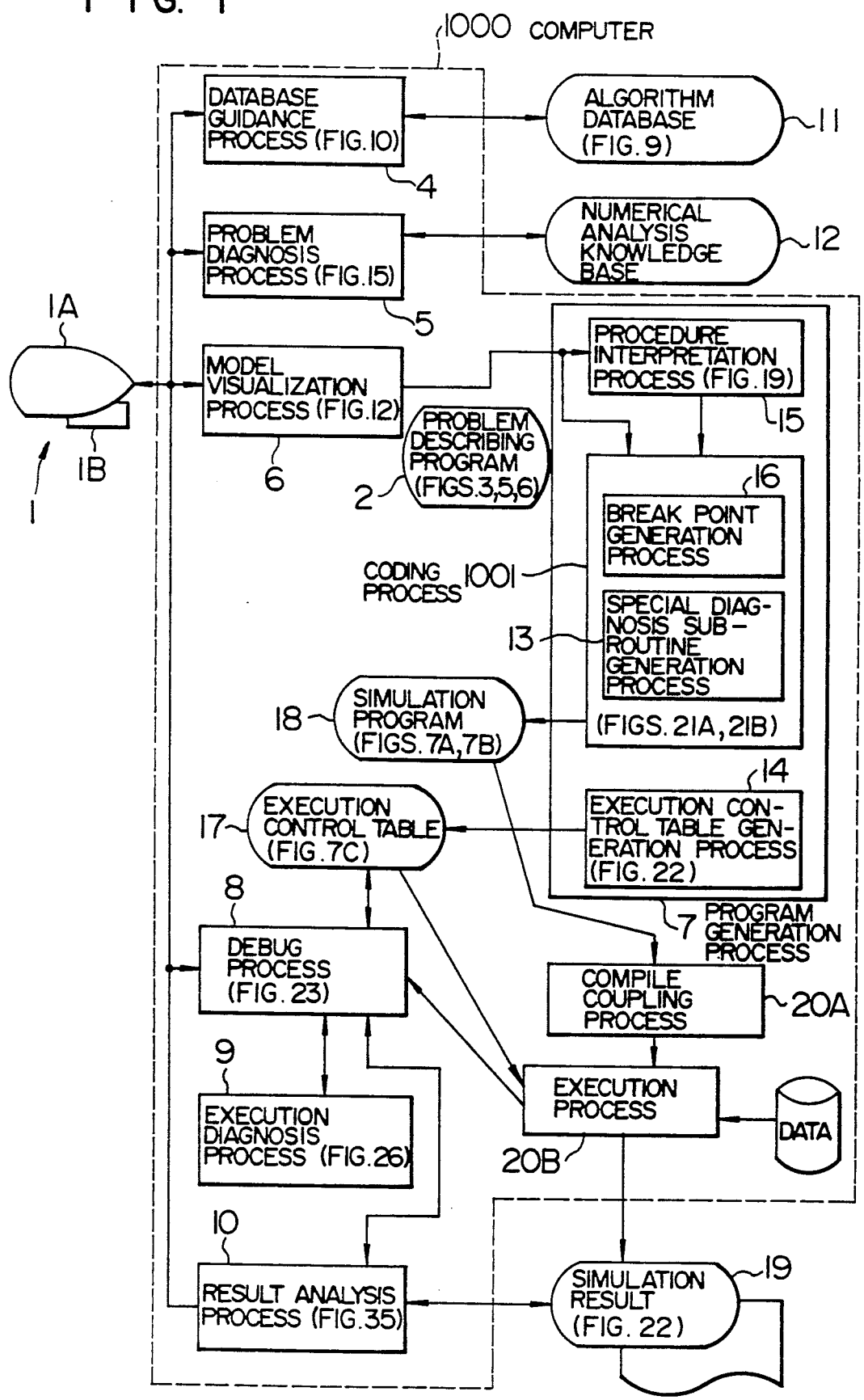

```
31 —— PROG    HEAT;
32 —— METHOD FDM;
33 —— DOMAIN X=[0:1],Y=[0:1.2];
33A —— TIME T=[0:1];
33B —— MESH X=[0:1:10],Y=[0:1.2:6];
33C —— TSTEP DLT={0(0.2)20.0};
34 —— REGION L=(0,*),R=(1,*),
              U=(*,1.2),D=(*,0),
              RC=([0:0.5],*),
              RI=([0.5:1],*),
              A=(*,*),
34A —— CONST  C=2.04D-3 AT RC,
              C=4.26D-2 AT RI;
34B —— VAR    F,FOLD;
34C —— COUNT  NT;
35 —— BCOND   F=100 AT D,
              F=100 AT U,
              DX(F)=0 AT L+R,
              FOLD:=F;
36 —— ICOND   F=0 AT A,FOLD:=F;
```
⎫ 400A

```
        SCHEME;
38 ——   ITER NT UNTIL NT GE 100;
39 ——   SOLVE F OF F = FOLD+DLT*DIV(C*
              GRAD(F)) BY 'ILUBCG';
39A ——    PRINT F;
39B ——    FOLD=F;
30 ——   END ITER;
        END SCHEME;
```
500A

```
        END;
```

```
PROG    HEAT;
METHOD  FDM;
DOMAIN  X=[0:1], Y=[0:1.2];
TIME    T=[0:1];
MESH    X=[0:1:10], Y=[0:1.2:6];
TSTEP   DLT=[0(0.2)20.0];
REGION  L=(0,*), R=(1,*),
        U=(*,1.2), D=(*,0),
        RC=([0:0.5],*),
        RI=([0.5:1],*),
        A=(*,*);
CONST   C=2.04D-3 AT RC,
        C=4.26D-2 AT RI;
VAR     F;
COUNT   NT;
BCOND   F=100 AT D,
        F=100 AT U,
        DX(F)=0 AT L+R;
ICOND   F=0 AT A;
```
⎫  
⎬ 400B  
⎭

```
SCHEME;
  ITER NT UNTIL NT GE 100;
510 ── SOLVE F OF DT(F) = DIV(C*GRAD(F))
511 ── THROUGH 'BACKWARD EULER' BY 'ILUBCG'
       PRINT F;
  END ITER;
END SCHEME;
```
500B

END;

```
 31 —PROG HEAT;
 32 —METHOD FDM;
 33 —DOMAIN X=[0:1], Y=[0:1.2];
33A —TIME T=[0:1];

33B —MESH X=[0:1:10], Y=[0:1.2:6];

33C —TSTEP DLT=[0(0.2)20.0]
 34 —REGION L=(0,*), R=(1,*),
            U=(*,1.2), D=(*,0),
            RC=([0:0.5],*),
            RI=([0.5:1],*),
            A=(*,*);

34A —CONST  C=2.04D-3 AT RC,
            C=4.26D-2 AT RI;

34B —VAR    F,G;
34C —COUNT  NT;
 35 —BCOND  F=100 AT D,
            F=100 AT U,
            DX(F)=0 AT L+R,
            G=50 AT D,
            G=50 AT U,
            DX(G)=0 AT L+R;
 36 —ICOND  F=0 AT A,
            G=0 AT A;
```
— 400C

```
        SCHEME;
 38 —     ITER NT UNTIL NT GE 100;

311 —       SOLVE F OF DT(F)=DIV(C*GRAD(F))
                THROUGH 'BACKWARD EULER' BY 'BCG';

312 —       RES(4)(SOLVE G OF DT(G)=DIV(C*GRAD(F))
                THROUGH 'EULER');
            PRINT F,G;
          END ITER;
        END SCHEME;
        END;
```
500C

F I G. 7B
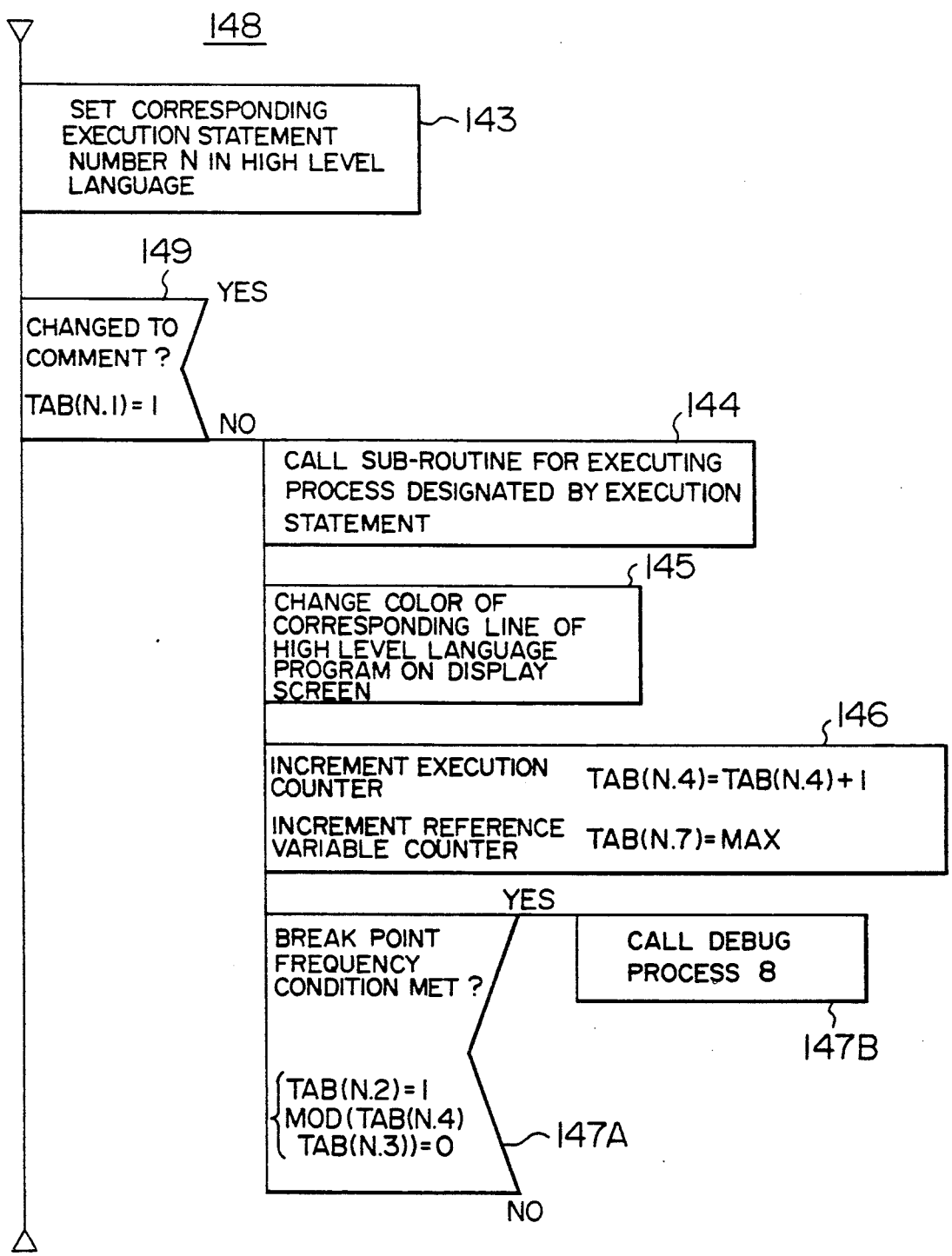

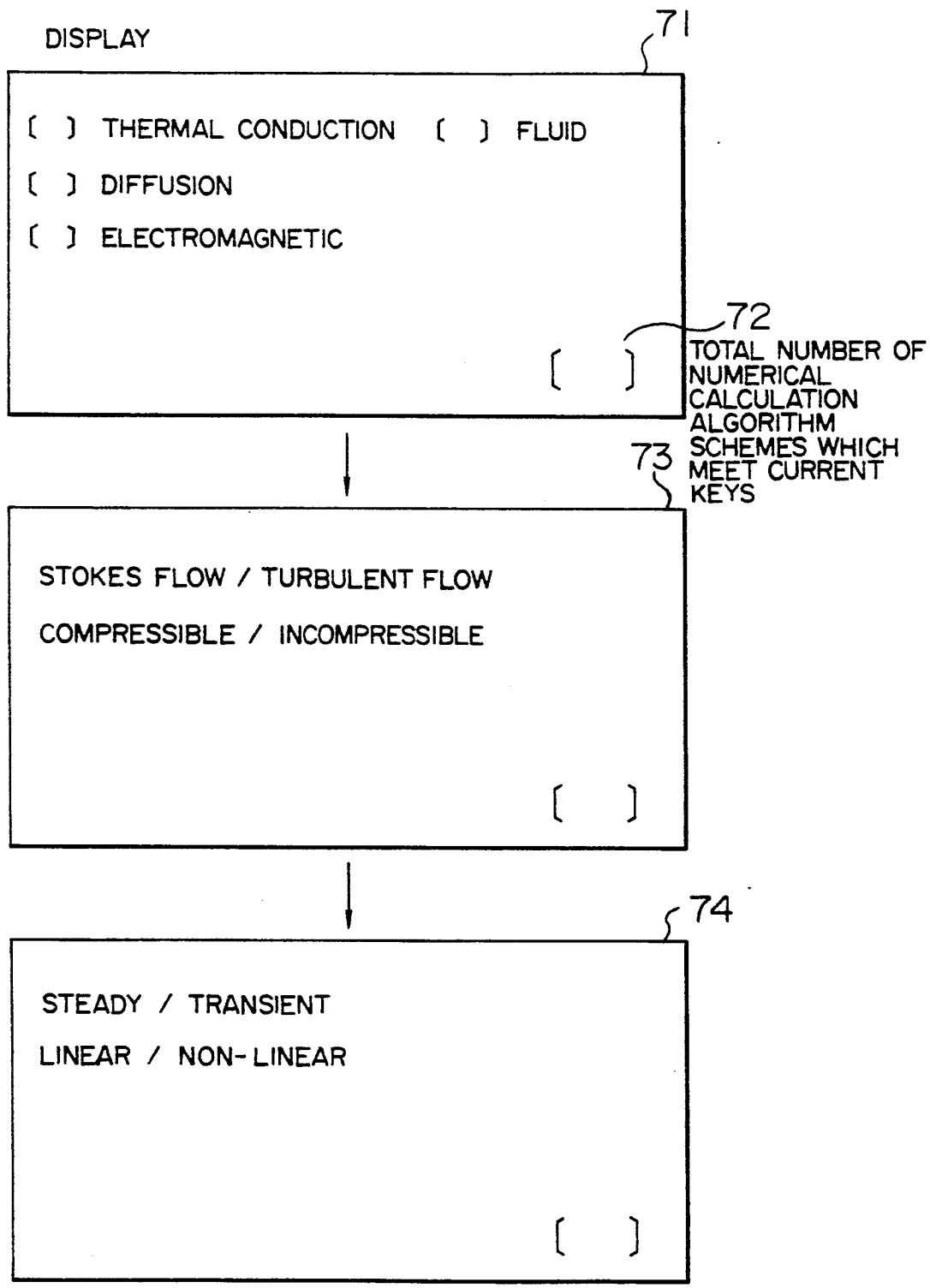

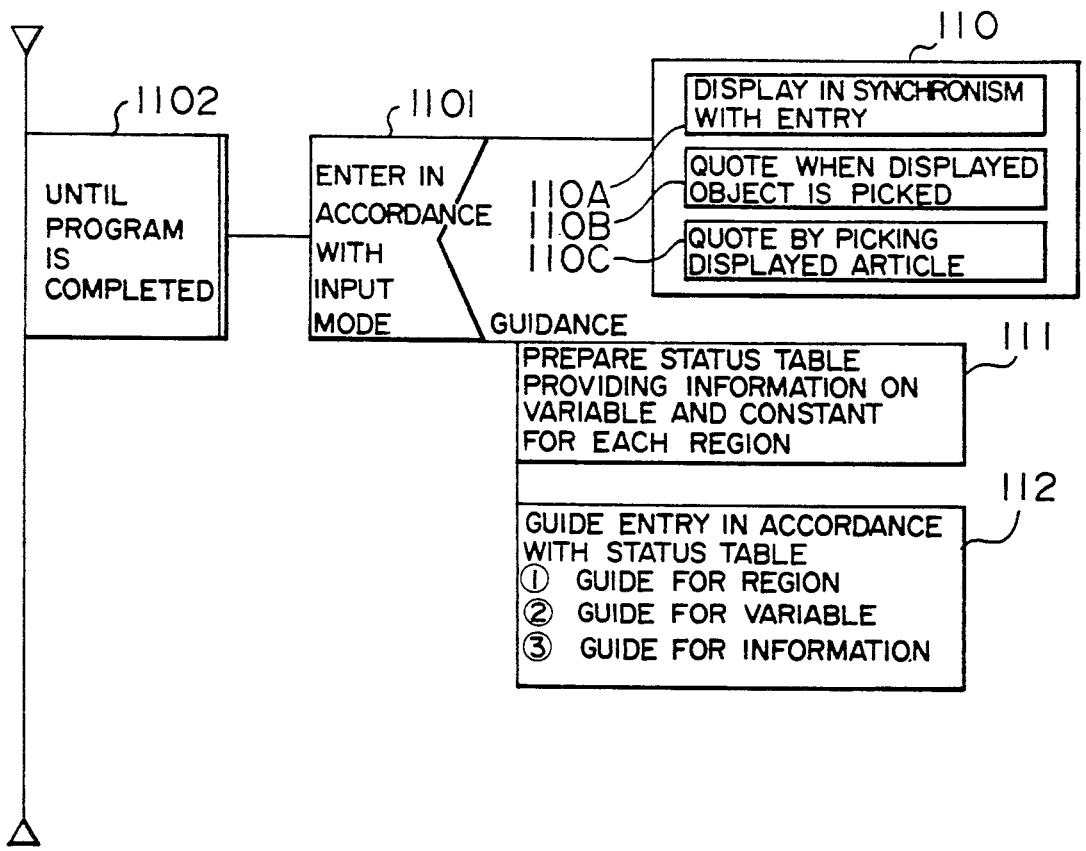

F I G. 18

132 — VAR FOLD;
133 — BCOND FOLD := F;
134 — ICOND FOLD := F;

135 — SOLVE F OF F = FOLD + DLT*DIV(C*GRAD(F))
         BY 'BCG';
136 — FOLD = F;

FIG. 19

15 PROCEDURE NAME INTERPRETATION PROCESS

SELECT DEVELOPMENT PROGRAM SKELETON INCLUDING DECLARATION PART NECESSARY FOR ALGORITHM SCHEME DESIGNATED BY PROCEDURE NAME AND SCHEME BLOCK PROGRAM STATEMENTS, FROM DEVELOPMENT PROGRAM SKELETONS STORED FOR VARIOUS ALGORITHM SCHEMES — 700

SELECT VARIABLE NOT USED IN PROBLEM / DESCRIBING PROGRAM AND DETERMINE VARIABLE NAME IN SKELETON — 701

MODIFY PROBLEM DESCRIBING PROGRAM BY SKELETON — 702

FIG. 20

121  122
RES(4)(SOLVE  FN  OF --------;)

124
EIG (SOLVE  FN  OF --------;)

CODING PROCESS    A PORTION OF 1001

CONTINUE TO FIG. 21B

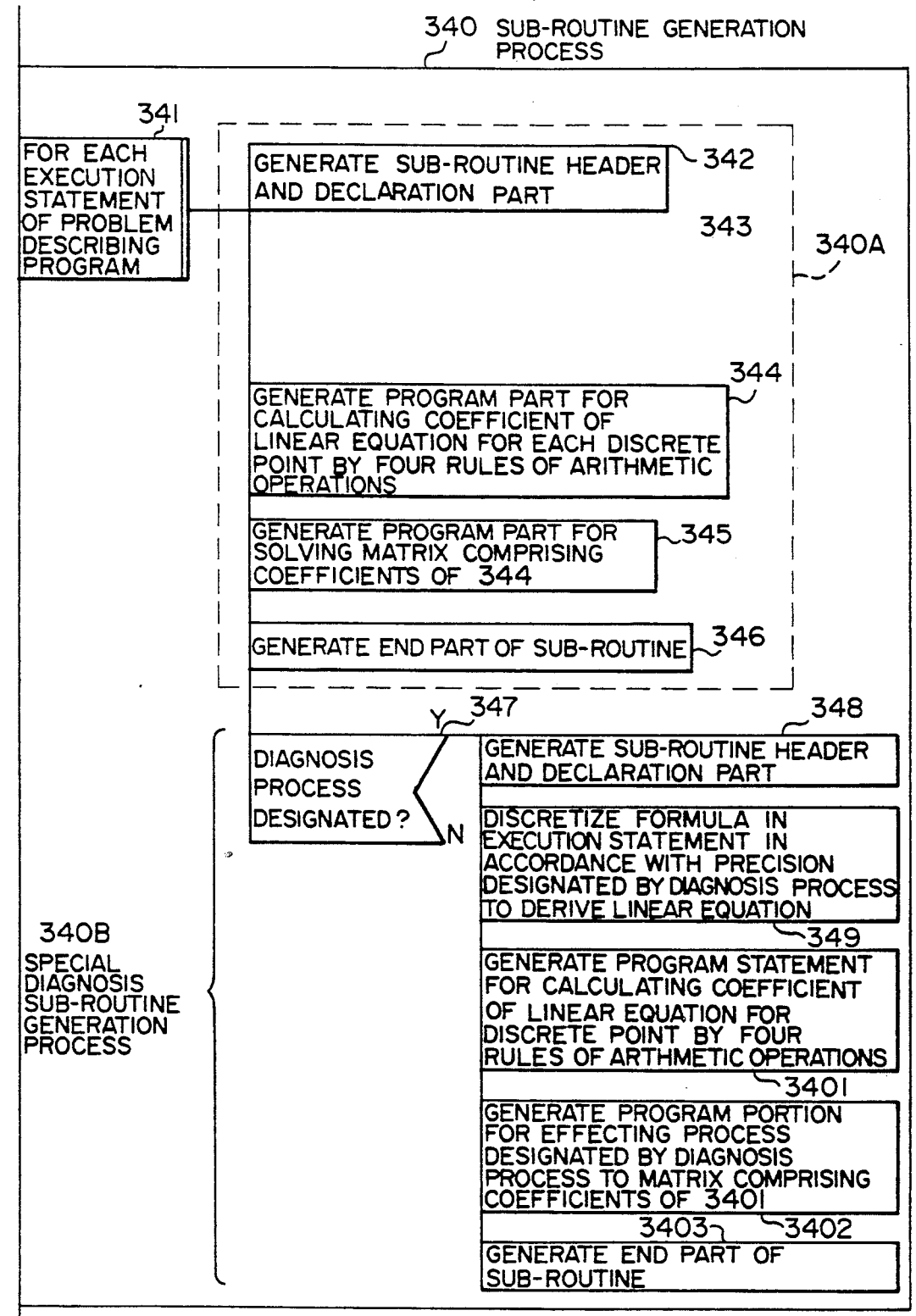

FIG. 24

180 DEBUG MENU SELECTION SCREEN

186 — [ ] < VARIABLE EXTRACTION FUNCTION >
     [ ] < VARIABLE GRAPHING FUNCTION > — 181
     [ ] < VARIABLE MODIFICATION FUNCTION >
183 — [ ] < RESULT ANALYSIS FUNCTION >
1801 — [ ] < RESIDUAL ERROR TEST FUNCTION >

<MATRIX TEST FUNCTION>
· INTERNAL FEATURE TEST FUNCTION
187 — [ ] REAL EIGENVALUE SPECTRAL DISTRIBUTION
     [ ] REAL EIGENVALUE NUMERICAL OUTPUT
· EXTERNAL FEATURE TEST FUNCTION
     [ ] DIAGONAL DOMINANCE PROPERTY TEST
     [ ] MAJOR DIAGONAL ELEMENT TEST
188 — [ ] COMPONENT BALANCE TEST
189 — [ ] DISCRETIZED POLYGON OUTPUT
     [ ] COEFFICIENT MATRIX EXTRACTION  } 182

<SCHEME TEST FUNCTION>
185 — [ ] STABILITY DIAGNOSIS

184 — [ ] < MODIFY EXECUTION CONTROL >
1802 — [ ] < END OF DEBUG >
MORE CURSOR TO [ ] OF DESIRED FUNCTION, ENTER S

MESSAGE :

FIG. 25

```
                ┌─ DESIGNATE Break/Comment
                │     ┌─ DESIGNATE Break FREQUENCY
                ↓     ↓
           SCHEME ;
        [ ][ ]  ITER NT UNTIL NT GE 100;              ⎤
172─┐         ~39                                     │
171─[B][4]  SOLVE F OF F = FOLD + DLT *               │
                                                      │
                  DIV(C*GRAD(FOLD)) BY 'ILUBCG';      ├─174
173─[C][ ]   PRINT F;                                 │
                                                      │
        [ ][ ]   FOLD = F;                            │
           END ITER;                                  ⎦
         END SCHEME;
       END;
```

191 PARAMETER INPUT SCREEN

☆ DIAGONAL DOMINANCE PROPERTY TEST ☆

DESIGNATE WEIGHT $\quad -->a=(\ 2.000\ )$

EXTRACT LINE WHICH MEETS

194 — $|Mii| < d * \sum_{j \neq i} |Mij|$

[ S ] GRAPHIC OUTPUT

[   ] NUMERICAL OUTPUT    ENTER S

192 RESULT DISPLAY SCREEN

DIAGONAL DOMINANCE PROPERTY TEST — 193

280 PARAMETER INPUT SCREEN

☆ REAL EIGENVALUE SPECTRAL DISTRIBUTION ☆

EIGENVALUE CALCULATION RESULT
 NUMBER OF EIGENVALUE
            CALCULATED = 77
 NUMBER OF REAL EIGEN-                NUMBER OF COMPLEX
            VALUES = 77                          VALUES = 0
 MAXIMUM REAL                          MINIMUM REAL
     EIGENVALUE 0.11131D+02             EIGENVALUE  -0.10000D+02

DESIGNATE OUTPUT PARAMETER

GRAPH BOTTOM   [ -0.10000D+02 ]
 GRAPH TOP      [  0.11131D+02 ]  }—282

NUMBER                  ╱283
    OF DIVISION   [ 100 ] (1~400)

281 RESULT DISPLAY SCREEN

FIG. 33

270 PARAMETER INPUT SCREEN

☆ COEFFICIENT MATRIX EXTRACTION ☆

DESIGNATE OUTPUT REGION 271    272
                      START    END
                      POINT    POINT

X-AXIS GRID NUMBER   [    ]  [    ]

Y-AXIS GRID NUMBER   [    ]  [    ]

OPTIONAL DESIGNATION

ADD DISTANCE ALONG COLUMN    273
   FROM MAJOR DIAGONAL POSITION  [  ] (ENTER S)

ADD GRID POINT NUMBER        [  ] (ENTER S)

ANALYZED MESH INFORMATION     274

NUMBER OF DIVISIONS ALONG X-AXIS = 10

NUMBER OF DIVISIONS ALONG Y-AXIS = 6

DATA MODIFICATION METHOD DESIGNATION SCREEN

DATA NAME DESIGNATION SCREEN

DATA RANGE DESIGNATION SCREEN

OUTPUT DESIGNATION SCREEN

MODE TRANSITION CHART

METHOD FOR AUTOMATICALLY GENERATING A SIMULATION PROGRAM FOR A PHYSICAL PHENOMENON GOVERNED BY A PARTIAL DIFFERENTIAL EQUATION, WITH SIMPLIFIED INPUT PROCEDURE AND DEBUG PROCEDURE

CROSS-RELATED APPLICATION

The following U.S. patents and patent applications are hereby incorporated by reference: U.S. Pat. Ser. No. 16,406, filed on Feb. 19, 1987, now U.S. Pat. No. 4,841,479; U.S. Pat. Ser. No. 593,568, filed on Oct. 9, 1990, which is a continuation of U.S. Pat. Ser. No. 245,201, filed on Aug. 29, 1988, now abandoned; U.S. Pat. Ser. No. 577,092, filed on Aug. 31, 1990, which is a continuation of U.S. Pat. Ser. No. 307,494, filed on Aug. 29, 1988, now abandoned, U.S. Pat. Ser. No. 307,494, filed Feb. 8, 1989, now U.S. Pat. No. 5,029,119; and U.S. Pat. No. 4,819,161.

BACKGROUND OF THE INVENTION

The present invention relates to a method for automatically generating, by a computer, a numeric simulation program for simulating a physical phenomenon by a computer, and more particularly to a method for generating a program which is suitable for substantially reducing the number of steps from the generation of the program to the analysis of the result, and a method for executing the program.

As shown in FIG. 2A, in a spatial area 21 in which two materials having different thermal conductivity coefficients, for example, concrete and iron, contact to each other, a change in an internal temperature when an initial temperature is 0° C. throughout the area, left and right walls L and R are isolated for heat, and upper and lower walls U and D are fixed to 100° C. may be simulated by solving a heat diffusion equation 22 in time by the computer.

The area 21 of FIG. 2A is divided into fine areas (called meshes) partially shown by broken lines, and linear equations on unknown values Fij at points (called nodes) representing the meshes, for example, vertices of the meshes, are desired from the partial differential equation 22. In FIG. 2B, a general form thereof is shown by 602. This is called discretization When the linear equations are derived for the nodes on the boundaries L and R of the area 21, a portion of the boundary condition, for example $$\frac{\partial F}{\partial X} = 0$$

is used. For the nodes on the boundaries U and D, a boundary condition F=100 is used instead of the linear equation Simultaneous linear equations comprising the linear equations derived for various nodes are solved to determine the unknown values F at the respective nodes.

As shown in FIG. 2B, a matrix equation 600 which comprises a matrix 602 of the coefficients (aij) of the simultaneous linear equations, a string 603 of the unknown values Fij and a string 604 of constant terms bi is solved to determine the unknown values Fij. The unknown values F at points in the area which are not at the nodes are determined by the interpolation of the determined unknown values Fij.

Such simulation is effective to the design of a circuit or a device but the matrix equation to be solved changes depending on the partial differential equation, the boundary conditions, the shape of the area and the procedure of numeric calculation. The physical phenomenon is usually represented by the partial differential equation, but this equation cannot be directly described by a commonly known high level language such as Fortran.

Thus, as described in the Journal of the Information Processing Society of Japan, Vol. 26, No. 1, pp 168-180, and JP-A-60-140433, a structure of a model to be simulated such as a shape of the area 21 in which the physical phenomenon to be simulated takes place, a partial differential equation and a calculation procedure therefor are described. A simulation program which is executable by a conventional computer, which is written in the FORTRAN language and which is for calculating the coefficient matrix and the constant terms of the matrix equation and calculating a solution for the matrix equation, is automatically generated from a program written in the high level language (problem describing program) by a program generation program.

FIG. 3 shows an example of a problem describing program written in a high level language. The program 2A illustrates a program for simulating the problem shown in FIG. 2A, Generally, it comprises a series of statements each of which starts with a key word representing a component of the program and ends with a semicolumn (;). A PROG statement 31 describes a title of the simulation program to be generated, and a METHOD statement 32 describes a numeric analysis method. In the present example, it indicates a differential method (FDM). A principal portion of the present program is divided into 400A and 500A. The portion 400A which comprises the statements 33, 33A-33C, 34, 34A-34C, and 35-36 defines a structure of a model to be simulated. This program portion includes a DOMAIN statement 33 for specifying X and Y coordinates of the analysis domain, a TIME statement 33A for specifying a time domain T, a MESH statement 33B for specifying the number of divisions by which the analysis domain is divided into a number of meshes in a matrix, a TSTEP statement 33C for specifying a time step interval DLT for tracking a solution along the time axis, a REGION statement 34 for specifying a title of a partial domain of the analysis domain, for example, a boundary or an internal divided domain, a statement 34A for declaring a constant such as a thermal conductivity coefficient or a material constant, a VAR statement 34B for declaring a physical variable used in the simulation program, a COUNT statement 34C for declaring a counter variable NT which represents the number of times of iteration of the numeric calculation, a BCOND statement 35 for specifying a boundary condition, and an ICOND statement 36 for specifying an initial condition. For example, in the REGION statement 34, a boundary at X=0 and any Y (represented by * in the present problem describing program) is named as "L", and in the BCOND statement 35, the name "L" is referred so that a heat isolation condition DX(F)=0 (where DX represents a first differentiation ∂/∂x) is set in the boundary sides L and R by using a location identifier AT.

The program portion which starts with a SCHEME statement and ends with an END SCHEME statement describes a numerical calculation algorithm scheme to solve the problem. It is hereinafter called a scheme block. In the present example, the statement 38 means that the statement 39 following the statement 38 to the statement 39B before the statement 30 are to be executed with a varying time step DLT until the number of times of iteration NT reaches 100. The numerical calculation algorithm scheme is a method for solving a partial differentiation equation in accordance with its characteristic (time dependency (steady or non-steady), non-linear or simultaneous). Generally, there are a plurality of solution methods for one equation.

The statement 39 means that a numeric solution F of a partial differential equation included therein is to be determined by an ILUBCG method (a BCG matrix solution method is applied by using a pre-processing by an incomplete LU decomposition). The statement 39A means that the determined F is to be printed out, and the statement 39B is an assignment statement which indicates that the variable FOLD is to be substituted by the determined F for use in the next iteration.

The ITER statement 38 to the END ITER statement 30 are iteratively executed until the condition following UNTIL in the ITER statement 38 is met. In each iteration, a temperature F at one time step later is determined by the SOLVE statement 39 based on the current temperature FOLD, and the current temperature F is updated by FOLD=F. DIV and GRAD represent divergence and gradient of a differential operator, respectively. In the present language, the partial differential equation can be expressed almost as it is.

The above program is translated to a simulation program in a FORTRAN language, for example, as shown in FIG. 4 by a program generating program (not shown). The program generating program checks syntax of the program such as type of data and type of statement, checks consistency in the domain, and checks suitability and sufficiency of the initial condition and the boundary condition, and then generates the simulation program by the FORTRAN language. In FIG. 4, a portion 42 which declares a variable and a work area necessary for the execution of the program, a portion 43 which generates and pre-processes the meshes, a portion 44 which sets values designated by the constant designation statement 34A (CONST statement) and the initial condition statement 36 (ICOND statement) of FIG. 3, and a control loop 45 are generated as a main program 41. The control loop 45 comprises a CALL statement (for example, 45A) of subroutines for the execution statements 39, 39A and 39B of the SCHEME block 400A of FIG. 3, an input/output control statement (not shown) and an ITER statement execution control 45B. Following the main program, subroutines 46 corresponding to the SOLVE statement 39 and subroutines 47 for the assignment statements 39A and 39B are generated. The subroutines 46 for the SOLVE statement 39 comprise equations described by the four rules of arithmetic operations for discretizing the partial differential equations in the statement and calculating coefficients of the resulting matrix equations, and a DO loop for iteratively calculating the above values. The subroutine for one SOLVE statement or assignment statement is automatically divided into a plurality of subroutines to prevent program units from being too long.

In the prior art, the entire problem describing program including the portion (scheme block) which the user describes by a text about the numerical calculation algorithm scheme is inputted. Accordingly, the user who is not aware of the numerical calculation algorithm scheme to be used cannot utilize it. Even if the numerical calculation algorithm scheme to be used is of well known standard type, the user has to describe it for each simulation. Thus, it takes time to input the problem describing program.

The user further has to check whether the input area or the equation is correct or not, and it takes time for the check.

The entire program has to be inputted by text, and it takes time for inputting.

The check of the content of the program is limited to the syntax error and an error in the numerical calculation algorithm scheme, for example, whether the model and the numerical calculation algorithm scheme meets a requirement of solution stability or convergence, is not checked. Such an error is totally due to the user and there is no way to check for such an error but for the user to check for any error after the execution of the generated simulation program. Consequently, the check and correction of the error are delayed.

In the prior art simulation program it is not possible to interrupt the execution at a time point designated by the operator in the course of the execution of the program, for the purpose of debugging. It is also not possible to interrupt the execution to perform debugging such as detection of an error in the numerical calculation.

In the prior art, no consideration is paid to a visual check by means of graphs of the diagnostic information to determine the correctness of the calculation result and the result of diagnosis, and there is also a problem with respect to the reliability of the simulation program.

SUMMARY OF THE INVENTION

It is an object of the present invention to provide a method for generating a simulation program which allows a user to input a problem describing program without specifically describing a numerical calculation algorithm scheme.

It is another object of the present invention to provide a method for generating a simulation program after checking any error in the numerical calculation algorithm scheme in the problem describing program which the user inputs to generate the simulation program.

It is another object of the present invention to provide a method for generating a simulation program in which a simulation model is graphically displayed on a display screen so that the problem describing program can be inputted by making use of the display.

It is another object of the present invention to provide a method for generating a simulation program which permits easy modification of the problem describing program by making use of the above graphic display.

It is another object of the present invention to provide a method for generating a simulation program based on the problem describing program having its numerical calculation algorithm scheme description simplified.

It is another object of the present invention to provide a method for generating a simulation program in which the execution of the simulation program can be interrupted for debugging when the simulation program executes a process requested by a program statement on the program designated by the operator.

It is another object of the present invention to provide a method for generating a simulation program in which a diagnosis program for special diagnosis in the debugging is generated as a part of the simulation program.

It is another object of the present invention to provide a debugging method which permits interruption of the execution of the simulation program for selectively performing a plurality of debugging processes.

In the present invention, several methods are provided to aid the user to input the problem describing program by using a database or a display screen.

A method for checking for any error in the numerical calculation of the input problem describing program is also provided.

Further, a method for generating a simulation program which permits interruption of the execution of the simulation program when the process on the problem describing program requested by the statement which the user has designated as a break point is executed by the simulation program is provided. Further, a debugging method for diagnosing the execution status of the simulation based on the designation by the user is provided.

BRIEF DESCRIPTION OF THE DRAWINGS

FIG. 1 illustrates a method for generating a simulation program and executing it in accordance with the present invention;

FIG. 3 shows an example of known problem describing program used in the process of FIG. 1;

FIG. 5 shows an example of another problem describing program used in the present invention;

FIG. 6 shows an example of a further problem describing program used in the present invention;

FIG. 7B shows a structure of an execution control part of the simulation program of FIG. 7A;

FIG. 11 shows an example of a database guidance display screen;

FIG. 12 shows a flow chart of a model visualization process (6);

FIG. 14 shows a structure of an application status table 113 used in the process of FIG. 12;

FIG. 18 shows a group of program statements generated in a procedure name interpretation process (15) of FIG. 1;

FIG. 19 shows a flow chart of the procedure name interpretation process (15);

FIG. 20 shows two examples of a program statement which requests a special diagnosis subroutine generation process (13);

FIGS. 21A and 21B show flow charts of different portions of a coding process 1001 in the program generation process (7);

FIG. 24 shows an example of a debug menu selection display screen of the debug process (8);

FIG. 25 shows an example of a display screen for indicating a break point of the debug process (8);

FIG. 33 shows a further example of the parameter input display screen of the execution diagnosis process (9);

DESCRIPTION OF THE PREFERRED EMBODIMENTS

Figure 2A:
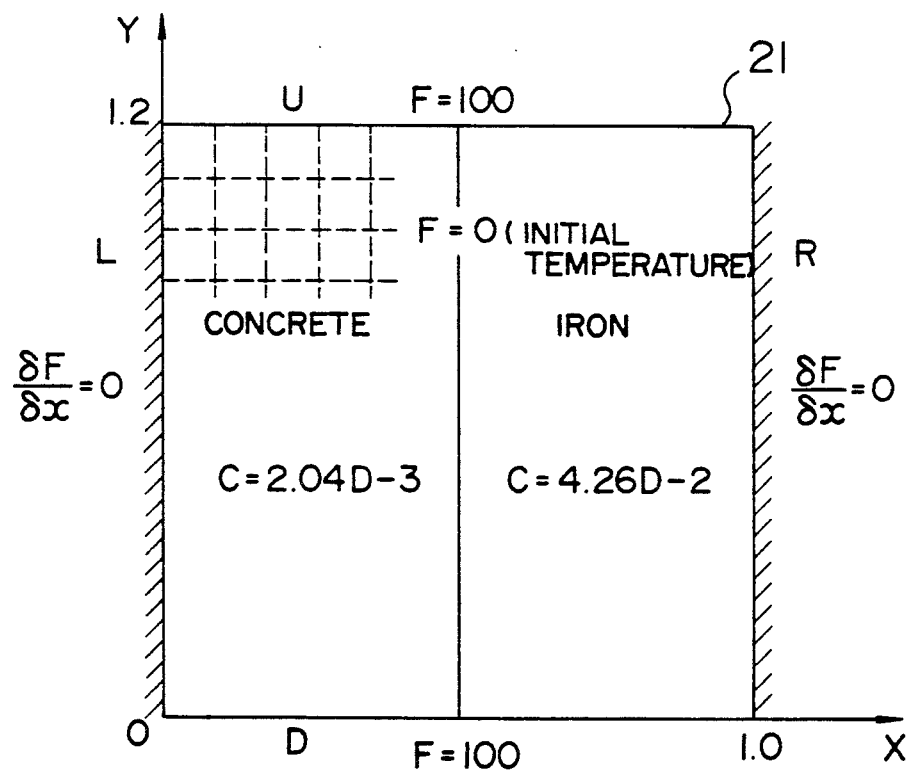
FIG. 2A shows a model of numeric simulation.

One embodiment of the present invention is now explained with reference to the drawings. First, an overall flow of operation is explained, and then details of the respective processes are explained.

FIG. 1 shows a group of program modules for generating and executing a program in accordance with one embodiment of the present invention.

The process flow of the program of FIG. 1 is described in the order of the inputting of a problem describing program 2, the generation of a simulation program 18, the execution of the program and the analysis of the result of the debugging.

Outline of database guidance process 4

The problem describing program 2 has the same structure as that shown in FIG. 3, or one of those shown in FIG. 5 and 6 to be explained later. The program 2 is inputted by an input/output device 1 which comprises a display 1A and a keyboard 1B. It is necessary for the problem describing program to include a program portion (scheme block) 500A which describes a numerical calculation algorithm scheme. As means to aid the inputting, in a database guidance process 4, a user inputs a characteristic of a user problem, for example, an application field of a problem to be solved or a characteristic of the equation (steady or non-steady, or linear or non-linear) as a search key with the input/output device 1 (an input example shown in FIG. 11), and a candidate for the numerical calculation algorithm scheme suitable to the problem is extracted from the program portion (scheme block) which has previously been stored in an algorithm database 11 and which describes numerical calculation algorithm schemes, and the scheme block therefor, for example, 500A in FIG. 3, is supplied to a display 1A. The user supplements it through a keyboard 1B to complete the problem describing program 2. Accordingly, the user can prepare the problem describing program which includes the appropriate numerical calculation algorithm scheme with little expert knowledge. When the same numerical calculation algorithm scheme is to be later used, it is not necessary to reinput the scheme block for the scheme. The numerical calculation algorithm scheme which has not been registered in the algorithm database 11 should be directly inputted by the user through the keyboard 1B.

Outline of model visualization process 6

Figure 13A:
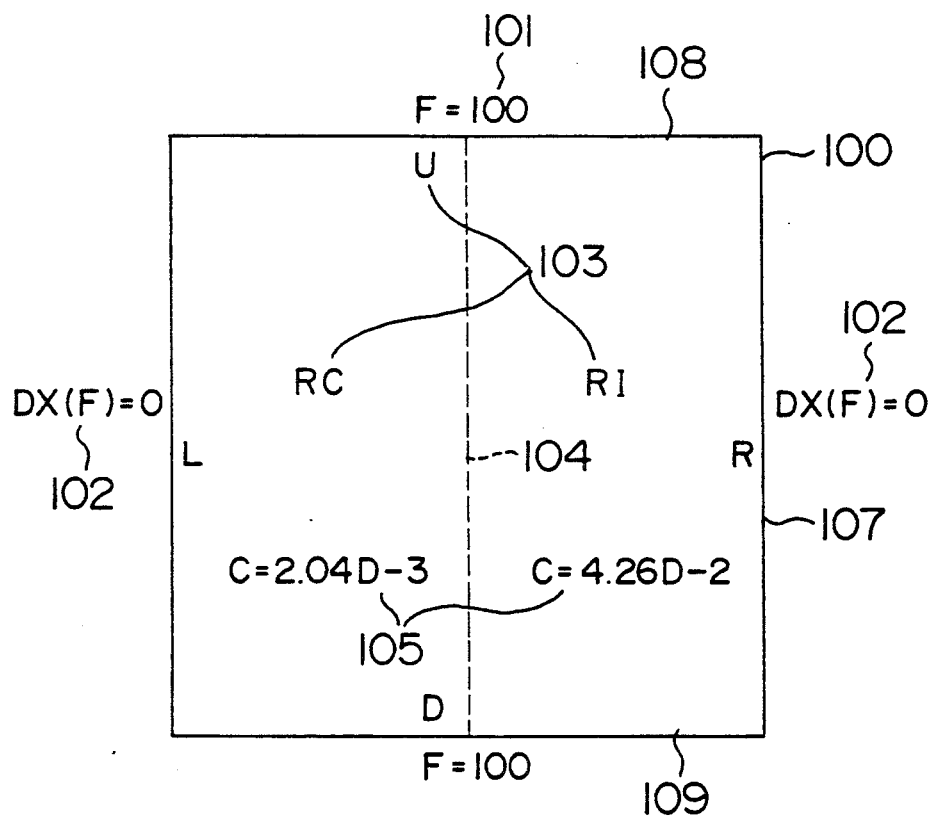
FIGS. 13A-13C show examples of different display screens in the model visualization process.

The problem describing program 2 inputted by the user or a portion thereof is divided into shape information and associated mathematical formula information and they are displayed on the display 1A by graphics and text (see FIG. 13A to aid the confirmation by the user. The user may pick a portion of the displayed image to add, delete or modify a program statement related thereto. In this manner, the inputting of the program statement by the display screen manipulation is permitted. Insufficient or inappropriate information in the problem describing program may be determined and the area on the display 1A relating to that information may be blinked to aid the modification or inputting of the information.

Outline of problem diagnosis process 5

An error in the numerical calculation algorithm scheme which does not meet a criterion of solution stability or convergence in the problem describing program is checked. A characteristic or title of the numerical calculation algorithm scheme which the user intends is extracted from the program by making use of the high level of the program language, a criterion of the solution stability and convergence to be met in the execution of the numerical calculation algorithm scheme is searched from the numerical analysis knowledge base 12 based on the extracted characteristic or name, whether the numerical calculation algorithm scheme described in the input problem describing program and the execution condition such as mesh density meet the criterion or not is checked, and if they do not meet, a position and method of the modification of the problem describing program are advised to the user. In this manner, the user can correct the error relating to the numerical calculation algorithm scheme before the generation or execution of the simulation program.

Outline of program generation process 7

Figure 7A:
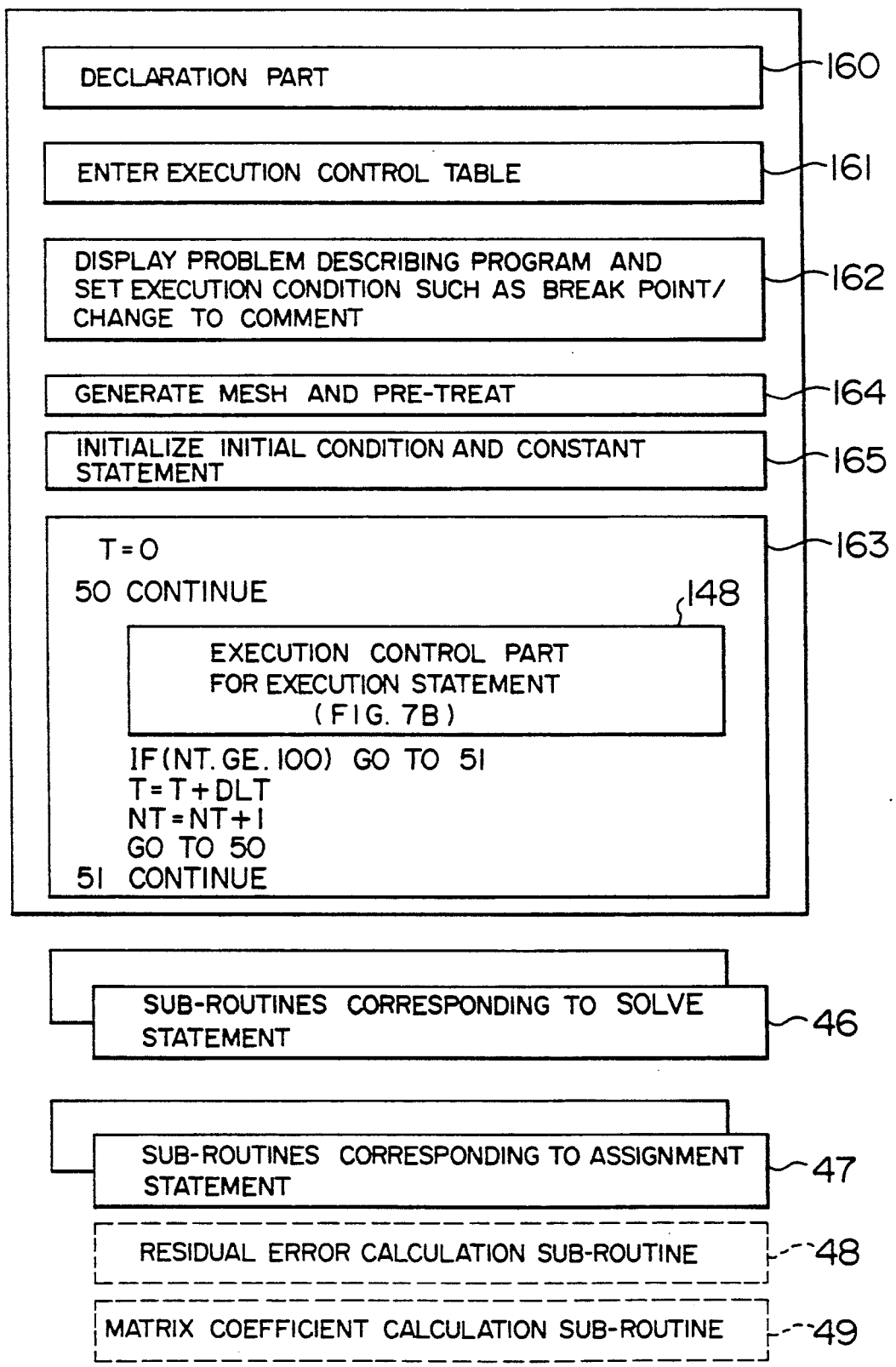
FIG. 7A shows a structure of a simulation program generated by the present invention.

A simulation program 18 which can be executed by a conventional computer by a standard language such as FORTRAN is generated based on the problem describing program 2A (FIG. 3) generated in the above process, or another type of problem describing program 2B (FIG. 5) or 2C (FIG. 6) to be described later. A general structure is shown in FIG. 7A. In the process 7, a break point generation process 16 which permits interruption of the execution of the simulation program 18 for debugging, and an execution control table generation process 14, are carried out.

In the present embodiment, as will be described later in detail, the execution of the simulation program 18 is interrupted when a user-designated statement in the problem describing program 2 is executed, and the intermediate result is diagnosed in various manners to determine if there is a problem in the simulation program 18. At the start of the execution of the simulation program 18, the debug process 8 is started by the simulation program 18. In the debug process 8, the problem describing program 2 is displayed on the display 1A so that the user may select a program statement to be used as the break point from the program statements of the program 2. Then, the simulation program 18 is executed, and when the simulation program 18 executes the process requested by the selected program statement, the simulation program interrupts the execution and restarts the debug process 8.

In the debug process 8, the user selects one or more previously prepared processes for diagnosing the execution result of the simulation program 2 which is then available.

In the debug process 8, the selected process is executed by the execution diagnosis process 9 and the result analysis process 10.

In the break point generation process 16, a program portion for starting the debug process 8 at the start of the execution of the simulation program 18 and a program portion for interrupting the simulation program 18 while it is executed are generated as a portion of the simulation program 18.

The execution control table 17 retains information on the program statement to be used as the break point. It is generated by the simulation program 18 by the execution control table generation process 14.

The diagnosis processes are previously prepared in the execution diagnosis process 9 or the result analysis process 10, as described above. However, a special diagnosis program must be generated in the generation of the simulation program 18.

The special diagnosis subroutine generation process 13 generates such a program as a subroutine (48 or 49 in FIG. 7A) of the simulation program 18.

In the procedure name interpretation process 15, a scheme block 500B in the problem describing program 2B of FIG. 5 is changed to the scheme block 500A of FIG. 3A to permit the generation of the simulation program from the problem describing program 2B having the name of a solution method for solving the partial differential equation added thereto by the SOLVE statement as shown by 2B in FIG. 5, separately from the generation of the break point.

As will be explained later, the description is simpler in the former than in the latter, and the problem describing program 2B is easier for the user to input.

Outline of program execution

The generated simulation program 18 is compiled, combined and executed in steps 20A and 20B. As described above, the user intervenes in the simulation program during the execution so that the execution status of the program can be verified. In the debug process 8, the execution status is displayed on the display 1A based on the execution control table 17 prepared by the program generation process 7 and started by the generated simulation program 18. More specifically, prior to the execution of the simulation program 18, the problem describing program 2 is displayed so that the user inputs a line (break point) at which the user will want to intervene, and the information thereof is reflected to the execution control table 17. Thereafter, the simulation program 18 is executed and when the intervention request point (break point) in the simulation program 18 is reached, the debug process 8 is started by the simulation program 18. Internal information such as variable values are received from the simulation program 18 and the execution diagnosis process 9 and the result analysis process 10 are started and the internal information is displayed, changed or modified. After the numerical values have been verified, the control is again returned to the execution status of the simulation program 18. In the execution diagnosis process 9, the nature of the matrix being analyzed and the criteria of the numerical analysis are checked. In the result analysis process 10, the calculated variables are processed by the four rules of arithmetic operations, differential and integral operations, or norm calculation to determine whether the criteria for the numerical analysis and the physical rules are met, and data at a local position is extracted and a graph which allows observation of an overall trend is prepared. The execution diagnosis process 9 and the result analysis process 10 are started by the debug process 8 and receive the internal information such as variable values from the debug process 8 to perform the execution diagnostic or the result diagnostic.

The result analysis process 10 may be performed during the execution of the simulation program 18 as well as for the final calculation result 19 of the simulation program.

Detailed operation flows of the respective processes in FIG. 1 are now explained.

Detail of database guidance process 4

A process flow of the database guidance process 4 of FIG. 1 is explained.

Figures 8, 9:
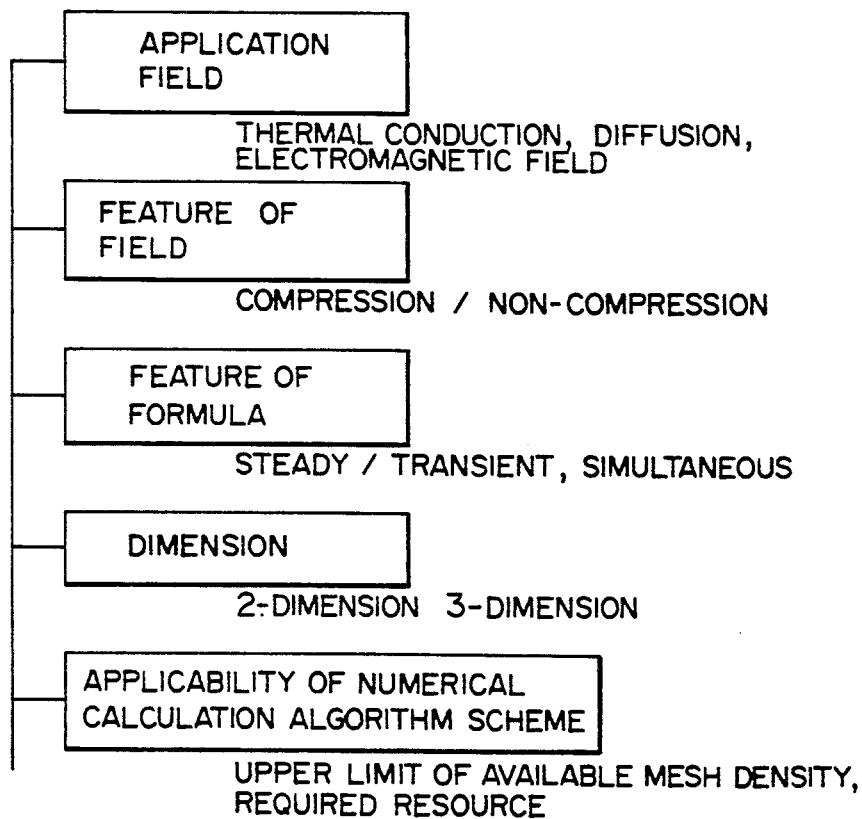
FIG. 8 shows an example of a group of search keys for an algorithm database.
FIG. 9 shows a configuration of the algorithm database (11)

FIG. 8 shows a group of key indices 51 for searching the numerical calculation algorithm schemes stored in the algorithm data base 11. They comprise (1) those for designating application fields as viewed from the user such as thermal conductivity, diffusion and electromagnetic field, (2) those for further designating characteristics of the fields (for example, compressible/incompressible and stokes flow/turbulent flow in fluid) which characterize the structure of the numerical calculation algorithm scheme, (3) those for designating the characteristics of formulas under consideration (for example, steady state/transient, simultaneous/single equation and linear/non-linear), (4) those for designating a dimension of the area in which the problem is defined, and (5) those for designating a restriction in applying the numerical calculation algorithm scheme, for example, an upper limit of an available mesh density, a resource in the computer which is required in the execution of the simulation program (for example, a main memory capacity or a calculation time) or actual usage of the numerical calculation algorithm scheme.

As shown in FIG. 9, the content of the database 11 comprises a value indicating whether a key index is included or not and a program portion (scheme block) which has requested the calculation algorithm scheme, for each numerical calculation algorithm scheme. The scheme block for the algorithm which has a group of keys matching to the input group of keys is selected from the database 11 in the following manner. An example of the scheme block is shown by 500A in FIG. 3.

Figure 10:
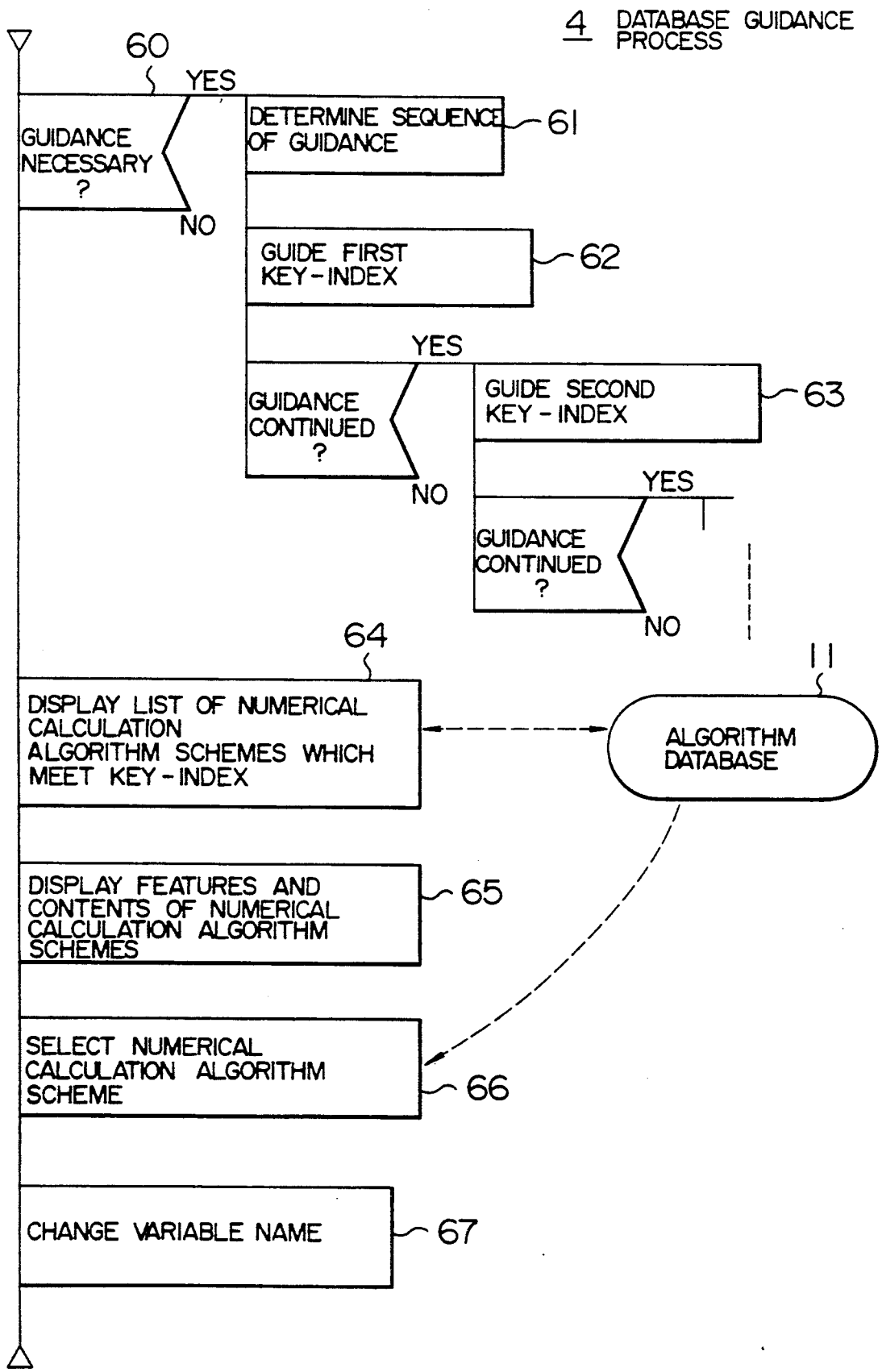
FIG. 10 shows a flow chart of an algorithm database guidance process (4)

FIG. 10 shows an operation flow of the database guidance process 4. First, the user indicates the need or non-need of the guidance through the display 1A, and the guidance is started by a step 60. First, the user determines the sequence of guidance to select the key indices for the numerical calculation algorithm scheme (step 61). A list of key indices is displayed on the screen so that the user may enter the sequence. In accordance with the first key index, a list of the corresponding indices is displayed on the screen (step 62). FIG. 11 shows a display screen 71 where the first key index is "application field". The parentheses 72 at the right bottom of the screen indicate the number of numerical calculation algorithm schemes which meet the current keys. As one key is selected on the corresponding screen and the guidance is further proceeded, the guidance by a second key index is performed (step 63) and the guidance screens 73 and 74 (FIG. 11) are displayed and the guidance is proceeded. When the proceeding of the guidance is terminated, a list of numerical calculation algorithm schemes which meet the keys designated so far is displayed (step 64). For one of the keys which user designates, a characteristic and a restriction which are not designated by the key index are displayed (step 65). For example, application capability to the problem (for example, Reynolds number in fluidics) and a resource (main memory capacity and CPU processing time) required to execute the numerical calculation algorithm scheme are displayed.

If the numerical calculation algorithm scheme is useful to the user's application, the user commands to select that numerical calculation algorithm scheme (step 66). The program portion (scheme block) (for example, 500A in FIG. 3) stored for the selected numerical calculation algorithm scheme is supplied to the display 1A. Since the physical constants used therein do not always conform to the problem which the user wants to solve, the variables used in the scheme block are changed to the variable names used in the user problem (step 67). A list of variables is displayed on the screen and the user enters the variable name which the user will use.

In this manner, desired ones of a plurality of numerical calculation algorithm schemes stored in the algorithm database 11 of FIG. 1 are rapidly selected. The entry of the scheme block by the user is no longer necessary.

The user is required to enter only the remaining part of the problem describing program, that is, the simulation model describing portion 400 (FIG. 3).

The method described in the database guidance process 4 may be changed so that the guidance is conducted by more user-intervention. For example, a list of key indices is displayed, the user designates one of the key indices to select the index, the list of key indices is again displayed, and the above steps are repeated to select key indices. Further, the content for the selected key index may be changed or modified.

In the present embodiment, if the user does not want to use the above guidance process 4, the user may enter the entire problem describing program through the keyboard 1B as is done in the prior art method.

Detail of Model Visualization

A process flow of the model visualization process 6 of FIG. 1 is now explained.

Figure 13B:
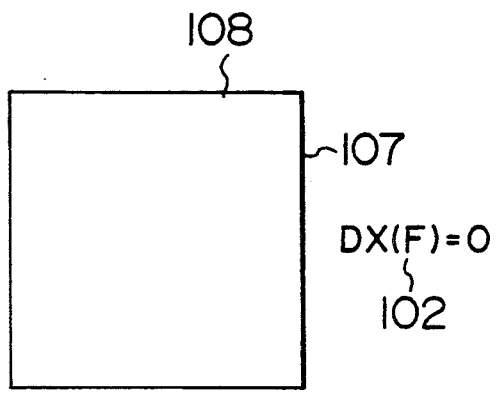
Figure 13C:
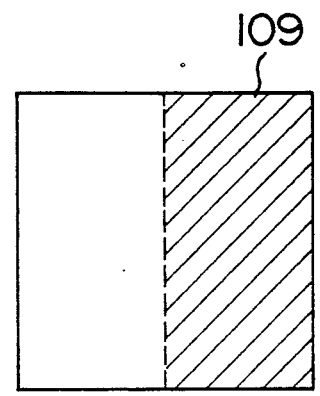

FIG. 12 shows a flow chart of the process 6. Normally, the following processes is performed until the entry of the problem describing program 2 (FIG. 3) by the user is completed (step 1102). The user sets an input mode to a mode in which the user inputs the problem describing program while the user supplements incomplete information by himself, or a mode in which the user inputs the problem describing program while the user receives guidance for the incomplete information (step 1101). In the user-oriented input mode, a process 110 is performed. Domain information or mathematical formula information which is designated by a statement of the problem describing program 2 of FIG. 3 is displayed on the display screen of the display 1A as visual information in synchronism with the input of the statement (step 110A). For example, as shown in FIG. 13A, a real shape 100 of an analysis domain designated by a domain designation statement DOMAIN 33 of FIG. 3 is displayed with the names of boundary sides L, R, U and D designated by the partial region designation statement REGION 34 of FIG. 3 or the names 103 of the divided regions RC and RI being displayed in the vicinity of or inside of the respective partial regions, the formula 105 designated by the physical constant designation statement CONST 34A of FIG. 3 being displayed in the partial region RC designated by the statement, and the boundary condition formulas 101 and 102 designated by the boundary condition designation statement BCOND 35 of FIG. 3 being displayed in the vicinity of the boundary region designated by the statement. In the program 2, the partial regions are defined by the DOMAIN statement 33 or the REGION statement 34, and the name of the partial region to which the formula designated by the CONST statement or the boundary condition formula is to be applied is quoted after AT in the corresponding formula. Accordingly, the above display is easily attained. In FIG. 13A, the boundary lines 104 of the partial regions RC and RI are also detected and displayed when the partial regions RC and RI are designated by the REGION statement. The problem describing program 2 may be modified to designate the information to be displayed such that the information designated by all input statements is not displayed as opposed to FIG. 13A but only the information relating to specific key words (DOMAIN, REGION, CONST, MESH, BCOND, etc.) or the information relating to specific variables or constants in the VAR statement and the CONST statement, or the information relating to specific regions, and the information derived from the combination of those designations are displayed. For example, FIGS. 13B and 13C show different graphic displays for the same problem describing program.

In the display step 110, whether the regions designated by the input statements or the formula are proper or not is determined (step 110B). When the user selects one of the displayed designation formulas and condition formulas on the screen, the partial region (divisional region or boundary side) in which it is applied is highlighted. On the other hand, when the user selects one of partial regions, the designation formula or condition formula applied thereto is highlighted. For example, in the display of FIG. 13A, if the boundary condition formula 102 in the vicinity of the right side 107 is selected, the boundary side 107 to which it is applied is highlighted.

The displayed partial region or formula is picked up by moving a cursor (not shown) onto the partial region or the formula and manipulating a key to command the selection.

In this manner, the user can selectively check the designation formula or the condition formula applied to the partial region, or the partial region to which the designation formula or the condition formula is applied. Thus, the user can check whether the region and the formula have been correctly designated by the input statements.

The above pick-up operation on the screen may also be utilized when the program statement is entered (step 110C).

When the partial region to which the designation formula or the boundary condition formula is to be applied is to be designated, the name thereof is not entered but the displayed partial region is picked up so that the name of the partial region already inputted is quoted. For example, if the upper side 108 of FIG. 13A is picked up, U is detected as the name of the boundary side by the comparison of the screen and the actual coordinate system. Then, if the boundary condition to be applied to U is inputted, the same statement as that which would be generated if U would be inputted and the boundary condition would be inputted is generated. Similarly, if the region 109 of FIG. 13A is picked up and the material constant is inputted, the same statement as that which would be generated if the name RI of the region 109 would be inputted and the constant would be inputted is generated.

In this manner, the input information is visualized for checking and the visual information is quoted to improve the programming efficiency.

On the other hand, if the input mode is set to the mode in which the program statement is entered while the user receives the guidance for the incomplete information of the input statements, the following two steps are performed after a branch process 1101.

First, an application status table 113 (FIG. 14) which indicates the variables and the constants applied to the partial regions is prepared based on the input statements (step 111). An example of data in the application status table 113 is for the program 2A of FIG. 3. The application status table 113 has an information partial region divided into an internal region and a boundary region (boundary side), and has flags 117–119 to indicate whether the names 114 and 115 of the respective regions, and the variables (F) and the constants (C) for the respective regions are to be designated as the boundary condition, the initial condition or the region-dependent information, and if they are to be designated, whether they have already been designated or not. The internal regions 114 and the boundary regions 115 may be extracted from the input shape information which is defined by the DOMAIN statement and the REGION statement in the program 2A of FIG. 3.

The flags 117–119 are set in the following manner. For each variable, the flag 117 is checked to determine whether the variable is a subject of a solution of a partial differential equation or not and whether the variable is under a two-order partial differentiation or not, and the flag 118 is checked to determine whether the variable is time-dependent or not, based on the input statements. If the decision is affirmative, the corresponding flag is set, and in other cases, it is reset. For each constant, the flag 119 is checked to determine whether the constant is region-dependent and the constant is referred in the formula or not, based on the input statements. The flag is set or reset depending on the decision. Then, whether the necessary information for the respective regions has been specified or not is checked based on the input statements. This is done by searching the CONST statements, the BCOND statements and the ICOND statements in the input statements. If the flags in the flag fields 117, 118 and 119 have been set, they are changed to completed flags, and if they have not been set, they are changed to uncompleted flags.

Then, the input operation is guided in accordance with the application status table 113 (step 112). In the guidance, the incomplete information may be guided in accordance with the designation of the user for each region, variable or information. In the guidance for the region, the application status table 113 is traced horizontally for each region to guide the entry of the information relating to the regions corresponding to the uncompleted flags. In the guidance for the variable, the table 113 is traced vertically for each variable to guide the entry of the variables corresponding to the uncompleted flag. In the guidance for the information, the table 113 is traced for all Yes/No flags of the same type for the variables and constants to guide the entry of the information. In entering the information in the guidance, the corresponding area of the region is highlighted, and the incomplete information is displayed by the system by the variable names and the types of information (condition names) in the form of text on the screen, to request the user to enter the necessary information. Similar guidance is an given in accordance with the present flow chart until the program is completed (step 1102).

Detail of problem diagnosis process 5

A process flow of the problem diagnosis process 5 of FIG. 1 is explained with reference to FIG. 15. In the present process, the user analyzes the structure of the scheme block (500A in FIG. 3) of the input problem describing program 2 (FIG. 3) with or without the aid of the guidance process 4 and the model visualization process 6 to check if there is an error in the numerical calculation, for example, in the convergence and the stability of the solution in the model describing portion (400A in FIG. 3) and the scheme block portion of the program.

The structure of the scheme block is first extracted (step 81). As shown in FIG. 16, the type of the program block in the scheme block such as an iteration block or a conditional branch block expressed by IF-THEN-ELSE is detected (step 90 (FIG. 16)), and the type of method for updating a statement for determining a physical quantity (hereinafter referred to as a physical quantity update statement) of the program statements in the scheme block is detected (step 91 (FIG. 16). In the detection of the iteration block, a statement indicating the start of the block (the statement 38 in the program 2 of FIG. 3) and a corresponding end part (the statement 30 in FIG. 3) are detected. In the detection of the type of method for updating the physical quantity update statement, whether a particular physical variable in the statement has been updated by a negative method or a positive method is determined. In the program 2 of FIG. 3, the SOLVE statement 39 and the assignment statement 39B are update statements for the physical quantities F and FOLD. It is determined that the physical quantity F has been updated by the SOLVE statement 39 in the negative method and FOLD has been updated by the assignment statement 39B in the positive method. Since the problem describing program 2 is written in the high level language, it is possible to readily detect the control of the scheme block and the type of method for updating the physical quantity. In the interpretation process 82 of the scheme block shown in FIG. 15, the structure of the scheme block is interpreted based on the detection information. As shown in FIG. 16 an interpretation process 92 (FIG. 16) for the iteration and the conditional branch block and a structure analysis process 93 (FIG. 16) of the scheme block are carried out.

In the interpretation process 92, whether the iteration or the conditional branch of the block is for solving time, non-linear or simultaneous equations is determined based on the control variable which is the condition for the iteration, the type of variable updated in the block and the number of nests in the block. For example, in the program of FIG. 3, the interpretation is such that the variable F is updated in the iteration block (statements 38-30), the update statement 39 of the variable includes a variable DLT which indicates a unit of time, and the block is a time iteration block for advancing the time because it is the outermost block.

Figure 16:
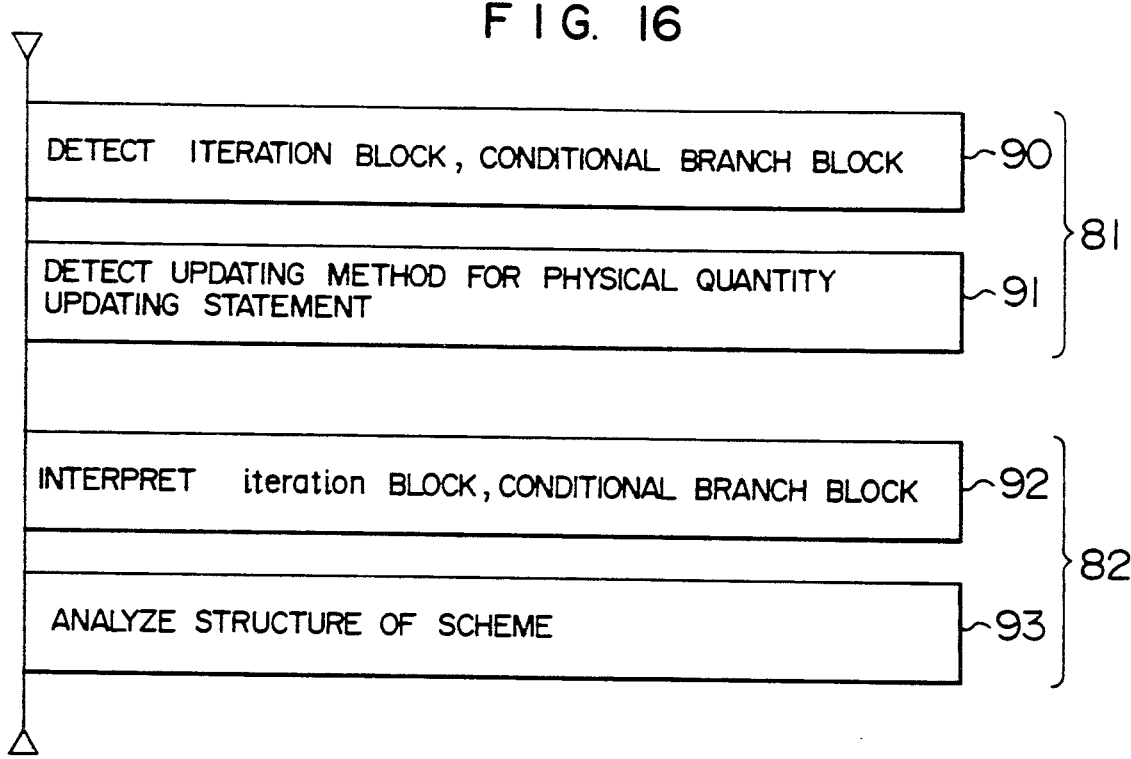
FIG. 16 shows a flow chart of a partial process (81, 82) of FIG. 15.
Figure 17:
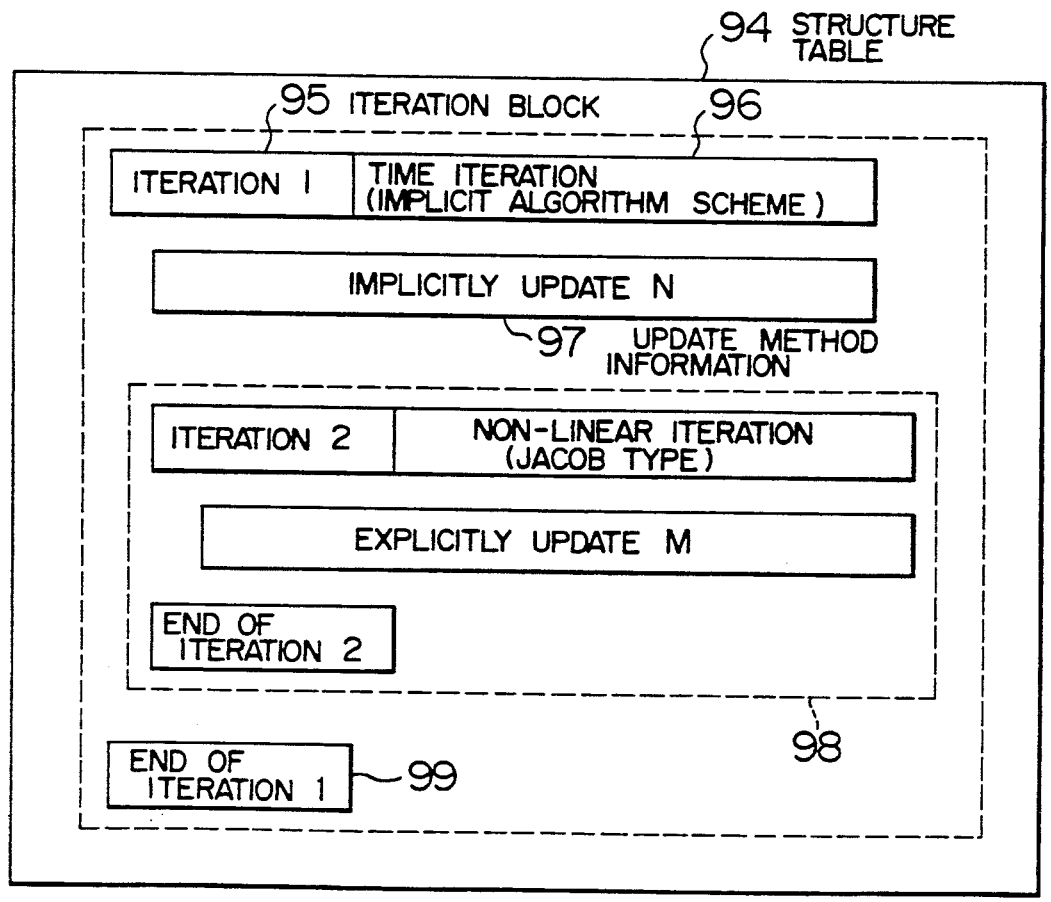
FIG. 17 shows a configuration of a structure table generated in the process (82) of FIG. 15.

In the structure analysis process 93, a scheme structure table 94 shown in FIG. 17 is formed based on the detection and interpretation in the above process. Iteration block information 95 is generated in the block detection process 90 (FIG. 16), update method information 97 is generated in the interpretation process 91, and iteration content 96 is generated in the block interpretation process 92. The iteration block information 95 retains a number for identifying the iteration block in the input problem describing program 2, for example, "iteration 1", the update method information 97 retains the meaning of the block, for example, "time iteration", and the iteration content 96 retains the method for updating the physical quantity in the block, for example, "update N in the negative method". In FIG. 17, numeral 98 denotes structure information for an additional iteration block when such an additional iteration block exists in the iteration block. Numeral 99 denotes information to indicate the end of the outermost iteration block.

Figure 15:
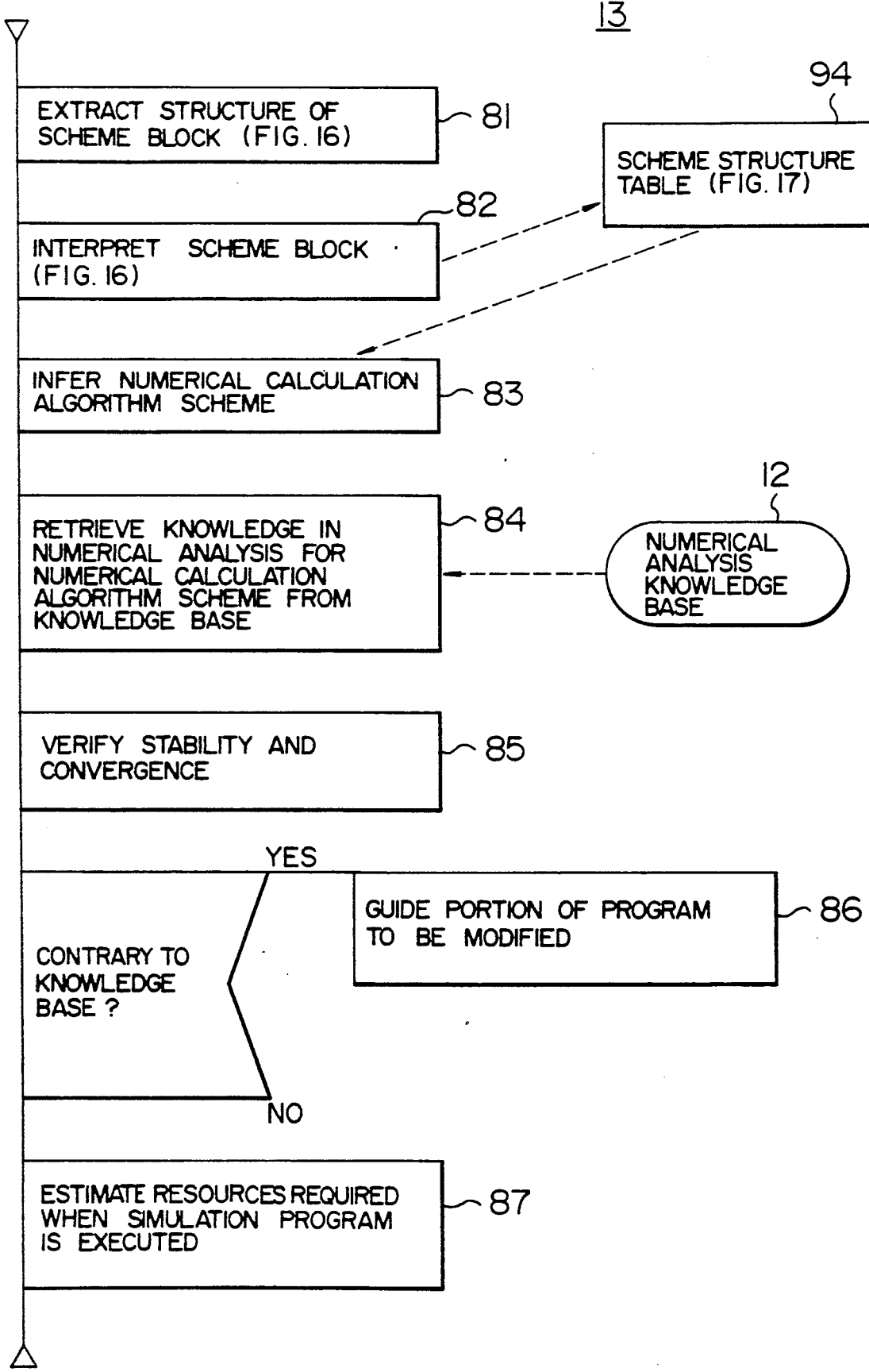
FIG. 15 shows a flow chart of a problem diagnosis process (13)

In the infer process 83 of the numerical calculation algorithm scheme of FIG. 15, the content of the numerical calculation algorithm scheme described in the scheme block i inferred based on the scheme structure table 94 of FIG. 17 formed in the structure analysis 93 (FIG. 16). The scheme is named in each field, and if it is a preregistered typical one, the name is detected based on the structure of the scheme block. If it is an unregistered numerical calculation algorithm scheme, the content of the structure table (FIG. 16) is analyzed to determine how the partial blocks in the scheme block update which ones of the physical quantities. For example, in the program of FIG. 5, the numerical calculation algorithm scheme of the scheme block 500B determines F as being updated along the time by the registered backward Euler type implicit algorithm scheme.

In a process 84 of FIG. 15, numerical analysis knowledge for the numerical calculation algorithm scheme is searched for in the numerical analysis knowledge base 12. The numerical analysis knowledge base 12 includes criteria and known rules for the mesh division or the number of times of iteration in using known, typical and preregistered numerical calculation algorithm schemes, and criteria for stability and convergence in using unregistered numerical calculation algorithm schemes such as time iteration, non-linear iteration and matrix solution methods.

In a verification process 85 for the stability and convergence in FIG. 15, whether the mesh and the iteration condition designated by the input problem describing program meet the critera of the stability for getting a stable solution and the criteria of the convergence for getting a physically reasonable solution, extracted from the knowledge base 12 is verified. For the unregistered general numerical calculation algorithm scheme, whether the criteria of the stability for stably getting a solution by the explicit algorithm scheme or the implicit algorithm scheme in a block for solving the time differentiation is met, or whether the condition of convergence that the block is not an infinite loop is met and what method is used to solve the non-linearity in the block for solving the non-linearity is determined. In a guidance process 86 of FIG. 15, if a block does not meet the criteria in the knowledge base, what criterion is not met and why it is not met are determined and a point in the program which is to be modified such as a mesh or an iteration condition is guided. For example, information such as divergence which will occur if a ratio of a spatial mesh to a time mesh is smaller than a predetermined level or the quantity known in the numerical analysis such as the Reynolds number has been actually used to a specific extent in the numerical calculation algorithm scheme is extracted from the knowledge base 12 and the modification to the mesh and the physical values is presented. Finally, in a process 87 of FIG. 15, the main memory capacity in the execution and the calculation time are estimated in order to diagnose whether the simulation program generated from the given high level language is practical or not. They are estimated based on the scheme structure table of FIG. 17 by a calculation formula weighted by the number of times of iteration for each block. Whether the method for updating the physical quantity is explicit or implicit, and if it is implicit, what solution scheme is used to solve the matrix are extracted from the high level language program. If the numbers of meshes in the space and the time are extracted, expected values for the load of each line of the high level language program and the number of times of execution are determined and the formula for calculating expected values of the required main memory capacity and the calculation time can be readily derived. The calculation time is given with a certain range.

In the present embodiment of the problem diagnosis process 5, the scheme structure of the given high level language program is directly interpreted and the numerical calculation algorithm scheme represented thereby is reversely extracted. When the database guidance process 4 is used in inputting the problem describing program 2, the scheme structure data may also be stored for the registered numerical calculation algorithm schemes so that the problem diagnosis process 5 is carried out based on the stored data. When the procedure name interpretation process 15 in the program generation process 7 of FIG. 1 is used, a portion of the numerical calculation algorithm scheme used in the scheme block is known as shown in the input example of FIG. 6, and the structure of the scheme block may be interpreted based thereon.

Detail of simulation program generation process 7

Characteristic processes

In FIG. 1, characteristic processes of the program generation process 7 in a coding process 1001 for generating the simulation program are a break point generation process 16 for generating a program portion for starting the debug process 8 in the simulation program immediately after the execution of the program portion in the simulation program which corresponds to the execution statements of the input problem describing program 2, for example, the statements 39, 39A and 39B in FIG. 3, a process 14 for generating the execution control table 17 which retains the control information for the execution to be used to interrupt the simulation program 18, a special diagnosis process generation process 13 for the debug process for generating a special diagnosis program which cannot be substituted by the execution diagnosis process 9 or the result analysis process 10, for example, to calculate a residual error to check how much a numerical solution resulting from the simulation meets a partial differential equation to determine the correctness of the numerical solution and calculate an eigenvalue of a coefficient matrix of a matrix equation used to solve the partial differential equation, and a procedure name interpretation process 15 for generating a simulation program from the problem describing program having the procedure name of a solution for the partial differential equation such as "THROUGH BACKWARD EULER" shown in FIG. 5 before the coding process 1001, in the same manner as that of FIG. 3.

Detail of procedure name interpretation process 15

In this process, the problem describing program 2B in FIG. 5 is modified to the program 2A shown in FIG. 3 so that the simulation program 18 may be generated from the problem describing program 2B shown in FIG. 5 which is simpler in description than that of FIG. 3.

For the conventional problem describing program 2A of FIG. 3, the SOLVE statement 510 of FIG. 5 designates the backward Euler's method as the procedure name 511 to the SOLVE statement. However, the partial differential equation in the SOLVE statement 510 is not expressed by a formula which uses the variable FOLD because of serial calculation. It is a simple description which does not include the declare statement of FIG. 3 relating to FOLD, for example, the statement 34B (VAR F, FOLD;), the boundary condition statement FOLD:=F; or the initial condition statement FOLD:=F;. In the process 15, the program which has the SOLVE statement that is modified to permit the serial calculation as shown in FIG. 3 is automatically generated from the simply described program 2B which has the SOLVE statement that is not modified to permit the serial calculation. Thus, the program statements shown in FIG. 18 are generated from the SOLVE statement of the given procedure name. The variable 132 of the variable name FOLD which is one step back and which is required by the above method (backward Euler's method), the declare statement 133 of the boundary condition therefor and the declare statement 134 of the initial condition are added to the model describing portion 400B of the input problem describing program 2B of FIG. 5, and the SOLVE statement 510 is developed by the designated method 511. Namely, the original partial differential equation is modified to the partial differential equation for the serial calculation which uses the variable FOLD, the SOLVE statement 135 which includes the above equation and the updated statement 136 for the one-step back variable FOLD are generated, and the original SOLVE statement 510 is replaced by the new statements 135 and 136.

FIG. 19 shows a flow chart of the process 15. In order to carry out the above processes skeletons (not shown) for developing various predetermined solution methods are provided, one of them is selected (step 700), the variable name (FOLD in the present example) which the user has not used in the program is selected (step 701), and the necessary declare statements are added and the skeleton is developed (step 702). For example, when the problem describing program 2B of FIG. 5 is applied to the procedure name interpretation process 15, it is developed into the problem describing program 2A shown in FIG. 3. Accordingly, it is not necessary to input the variable FOLD which does not appear in the problem in constructing the numerical calculation algorithm scheme nor is it necessary to input the necessary declare statements. Accordingly, the problem describing program can be inputted more easily.

In FIG. 5, the partial differential equation includes the partial differentiation with time, and the procedure name interpretation process 14 modifies it to the partial differential equation which is in a form suitable for the serial calculation. The process 15 may be used not only for the modification of the time dependent partial differential equation but also for the modification of a non-linear partial differential equation to the form suitable for the serial calculation.

Structure of simulation program

FIG. 7A shows an overall structure of the simulation program, and FIG. 7B shows a detail of the configuration of the execution control part 148 which is generated for each of the execution statements of the problem describing program.

Figure 4:
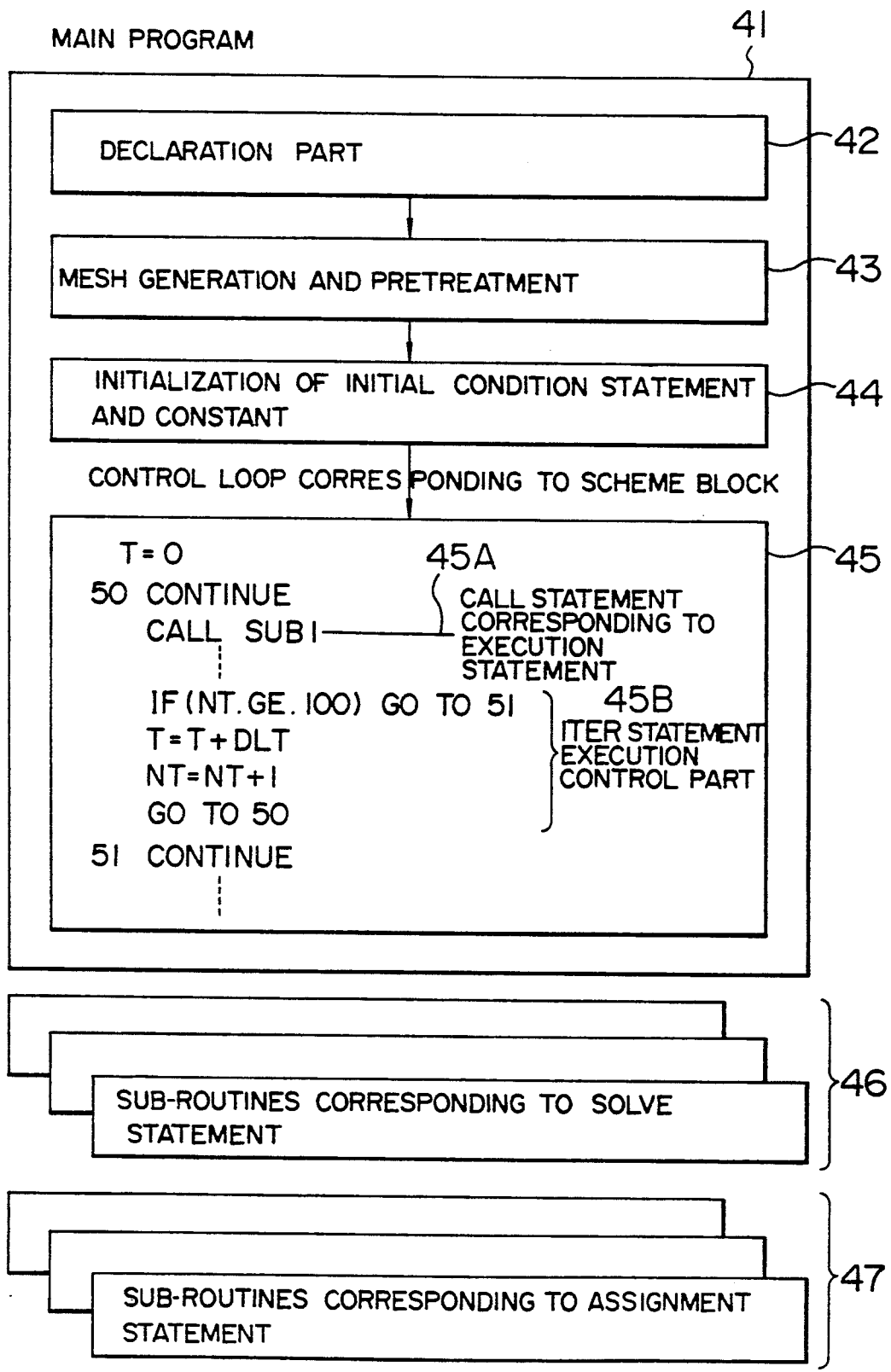
FIG. 4 shows a structure of a simulation program generated by a prior art method.

In the prior art method for generating the simulation program, as shown by 45A in FIG. 4, a CALL statement for calling a sub-routine to execute the process required by the statements of the problem describing program 2 is generated for each execution statement. On the other hand, in the simulation program 18 generated by the present invention, a generation process (161) of the execution control table 17, a set process (162) of display and execution condition of the problem describing program 2, and an execution control part 148 for each of the execution statements of the problem describing program 2 are provided at the beginning of the main program as shown in FIG. 7A. The execution control part 148 includes a call statement 144 for calling a sub-routine for the execution statement as well as additional portions 145, 146, 147A, 147B and 149 for controlling the execution in accordance with the break point as shown in FIG. 7B, and sub-routines 48 and 49 for executing a special diagnosis required by the problem describing program 2 as will be discussed later. In the execution control table generation process 161, the execution control table 17 (FIG. 1) is generated, and the execution condition set process 162 sets the information relating to the break point which the user designates to the execution control table 17 prior to the execution of the simulation program itself. Namely, the problem describing program 2 is displayed on the display screen (see FIG. 25), and the user designates the line position of the execution statement in the program to set the break point. Alternatively, it may be previously designated in the problem describing program 2 and the information is set when the simulation program is generated, or a format previously set in a predetermined external file may be inputted.

Special diagnosis sub-routines 48 and 49

Those are generated as a portion (sub-routines) of the simulation program 18 to execute special diagnosis processes which are not provided as the execution diagnosis process 9 or the result analysis process 10 of the processes used for debugging in the execution of the simulation program. Namely, diagnosis processes can diagnose by making use of the result in the course of execution of the simulation program 18 as will be described later. However, some of them cannot diagnose unless data for the diagnosis is prepared in the execution of the simulation program.

The sub-routines 48 and 49 are used to generate the data for such a special diagnosis or to diagnose it.

Such sub-routines are generated under the direction by the user. The user directs by parenthesizing the SOLVE statement which solves the partial differential equation in the problem describing program 2 as shown in FIG. 20 and adding to the SOLVE statement the key word such as a residual error diagnosis command key word 121 or a matrix diagnosis command key word 124 and the required diagnosis precision described in the parentheses following the key word.

FIG. 6 shows an example of the problem describing program which includes the SOLVE statement 312 including the diagnosis process generation designation (RES (4)), in addition to the SOLVE statement 311 which includes the procedure name (THROUGH 'BACKWARD EULER'), similar to FIG. 5.

In FIG. 20, the residual error diagnosis command key word 121 commands the remaining difference diagnosis to check to what extent the numerical solution derived from the execution of the SOLVE statement meets the original partial differential equation. The matrix diagnosis command key word 124 commands the matrix diagnosis when the numerical solution of the SOLVE statement is obtained. In the residual error diagnosis, a difference between both sides when the numerical solution is put in both sides of a linear equation derived by discretizing both sides of the partial differential equation may be calculated. Since it does not solve the discretized linear equation, it does not affect the required capacity of the main memory whatever high precision discretization may be made. Accordingly, the user designates the residual error calculation precision by the parameter 122 in the parentheses which indicates the four-order precision, for example. Since the matrix is generated by the simulation program for the SOLVE statement, the matrix diagnosis is executed by the program in the execution diagnosis process 9 by making use of the matrix.

Accordingly, no special diagnosis program is prepared for those statements. However, for the assignment statement which includes a differential operator in a right side thereof (for example, the SOLVE statement 39 of FIG. 3), it is necessary to generate a program for calculating a value of the matrix coefficient for the differential operator for the known quantity FOLD.

Coding process 1001

Figure 21A:
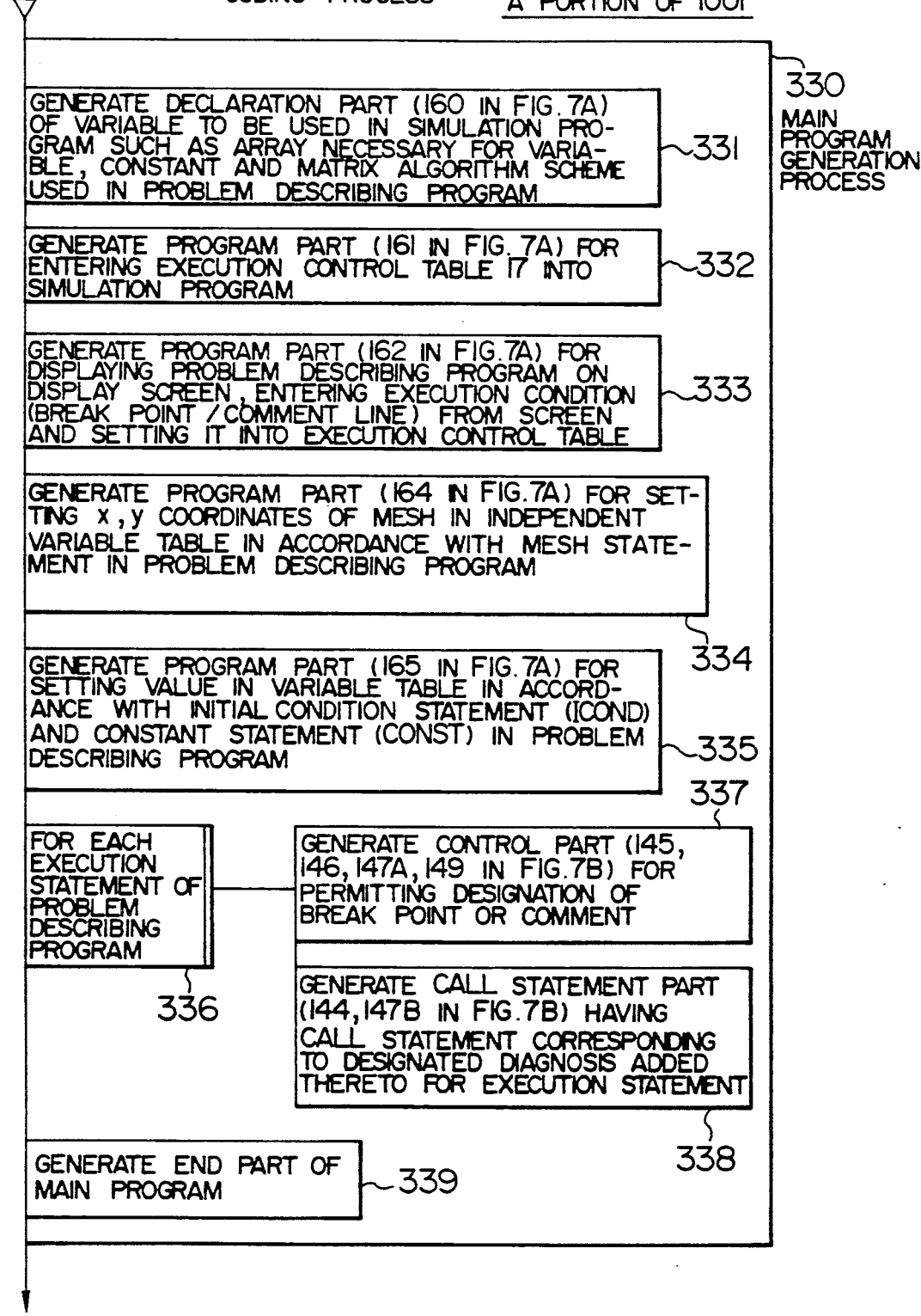

The overall process flow of the coding process 1001 is explained with reference to FIGS. 21A and 21B. A function of the generated simulation program 18 is shown in FIG. 7A and a detail of the execution control part 148 is shown in FIG. 7B. The process 1001 comprises a program generation process 330 (FIG. 21A) and a sub-routine generation process 340 (FIG. 21B). In those figures, the processes 332, 333, 337, 338, 347-349 and 3401-3403 in the blocks shown by thick lines are characteristic processes of the present invention. The individual processes are the same as those in the known method for generating the simulation program.

First, the main program generation process 330 is explained with reference to FIG. 21A. A declaration part (160 in FIG. 7A) of the variable used in the simulation program such as an arrangement necessary for variables and constants used in the problem describing program and the matrix solution method, is generated (step 331). Then, a program part (161 in FIG. 7A) for generating the execution control table 17 (FIG. 7C) as a portion of the simulation program 18 is generated (step 332). In the execution of the simulation program 18, the problem describing program 2 is displayed on the display 1A and the user enters the execution condition (break point/comment line) with the keyboard 1B to generate a program part (162 in FIG. 7A) to be set into the execution control table 17 (FIG. 7C) (step 333). Then, a program part (164 in FIG. 7A) for setting x and y coordinates of the mesh into an independent variable table (not shown) in accordance with the MESH statement 33B for designating the mesh in the problem describing program 2 is generated (step 334).

Then, a program part 165 (FIG. 7A) for setting the value designated by the initial condition designation ICOND statement 36 and the constant designation CONST statement (34A) in the problem describing program 2 into the variable table (not shown) in the simulation program in accordance with those statements is generated (step 335). Then, the execution control part 148 (FIG. 7A) for designating the break point and the comment for each of the statements of the problem describing program 2, for example, the statements 39, 39A and 39B in FIG. 3, is generated (step 337). As the execution control part 148, a call statement 144 which calls the sub-routine provided for each of the execution statements as shown in FIG. 7B and a call statement 147B (FIG. 7B) which calls the debug process 8 (FIG. 1) or the special diagnosis sub-routine 48 or 49 (FIG. 7A) when the execution statement is designated as the break point are generated (step 338). After the processing for all execution statements of the problem describing program 2, the end part of the main program is generated (step 339).

Figure 2B:
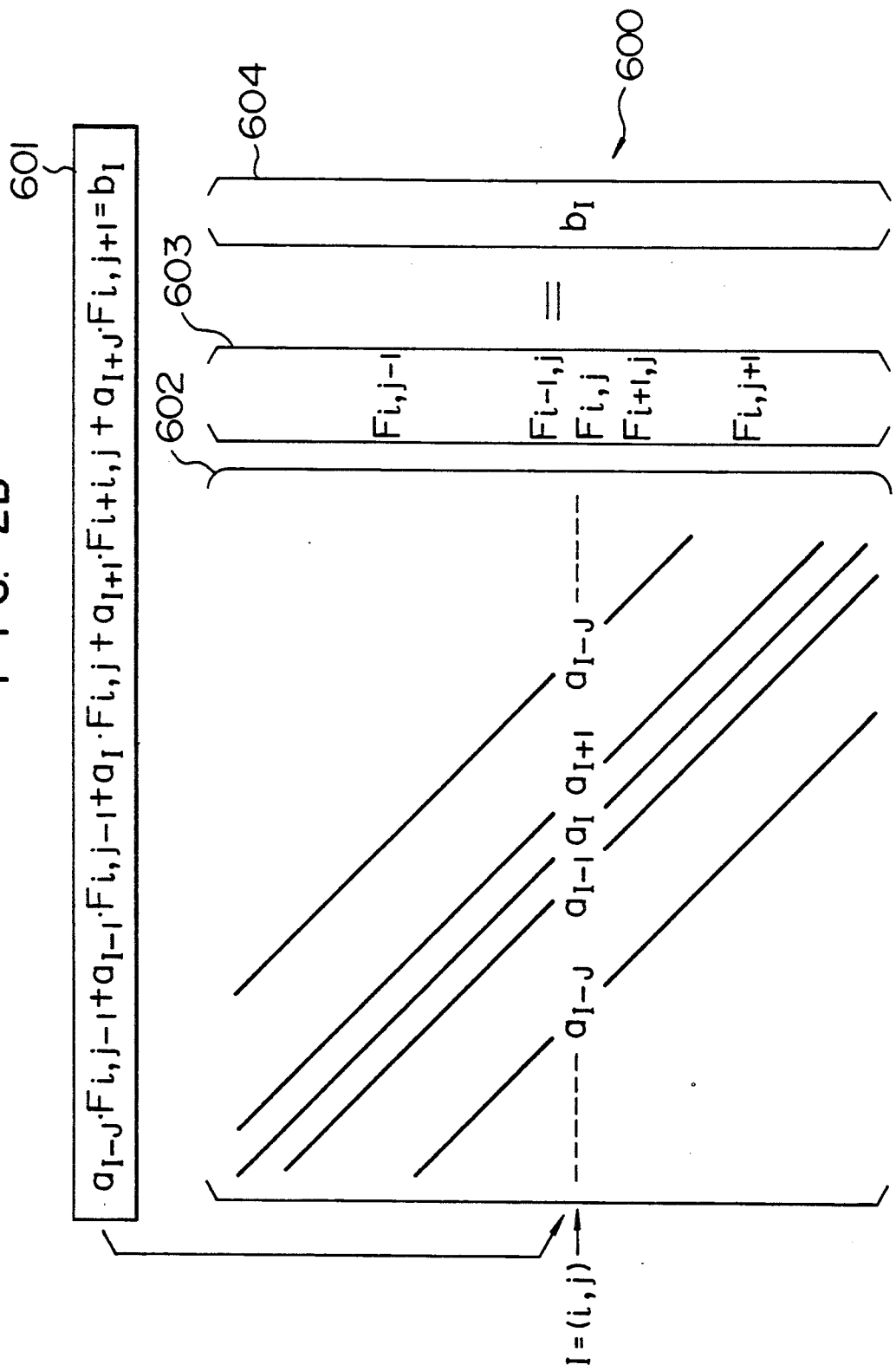
FIG. 2B shows a matrix equation generated when a partial differential equation of the model is solved.

The sub-routine generation process 340 is now explained with reference to FIG. 21B. The sub-routine generation process 340 repeats the following processes for each execution statement of the problem describing program 2 (step 341). First, a header of the sub-routine for the execution statement is generated and a necessary declare part is generated (step 343). Then, if a differential operator is included in the formula in the execution statement, the formula is discretized (that is, the partial differential equation is converted to simultaneous linear equations on a finite number of nodes called discretization points in the analysis domain) in accordance with a differential method or a limited element method to prepare linear equations. A program part for calculating a coefficient of the linear equation for each discretization point by the four rules of arithmetic operations is generated (step 344). A part for solving a matrix equation (for example, FIG. 2B) comprising coefficients is generated (step 345). Thus, the above formula which is included as the execution statement is solved. Then, an end part of the sub-routine is generated (step 346). Those are same as that of the conventional process, but in the present invention, the following processes are added in order to generate the special diagnosis sub-routine 48 or 49 (FIG. 7A) for each execution statement. If the designation of the above diagnosis process, for example, the residual error diagnosis process is applied to any execution statement in the problem describing program 2 (step 347), a sub-routine header for the diagnosis program is generated and a necessary declaration part is generated (step 348). The execution statement is discretized in accordance with the precision of diagnosis designated by the user to get the linear equation (step 349). A program part for calculating the coefficient of the linear equation for each discretization point by the four rules of arithmetic operations is generated (step 3401), and a part for processing the matrix comprising coefficients in accordance with the request from the diagnosis process is generated (step 3402). For example, for the residual error diagnosis, a formula for putting the solution derived from the execution statement into the linear equation generated in the present process, and for the matrix diagnosis, a program part for solving the equation or calculating the eigenvalue, is generated. Finally, an end part of the sub-routine is generated (step 3403).

In FIGS. 21A and 21B, the steps 332, 333 and 337 correspond to the break point generation process 16, and the steps 338, 347, 348, 349, 3401, 3402 and 3403 correspond to the special diagnosis sub-routine generation process 13.

Structure of execution control table 17

Figure 7C:
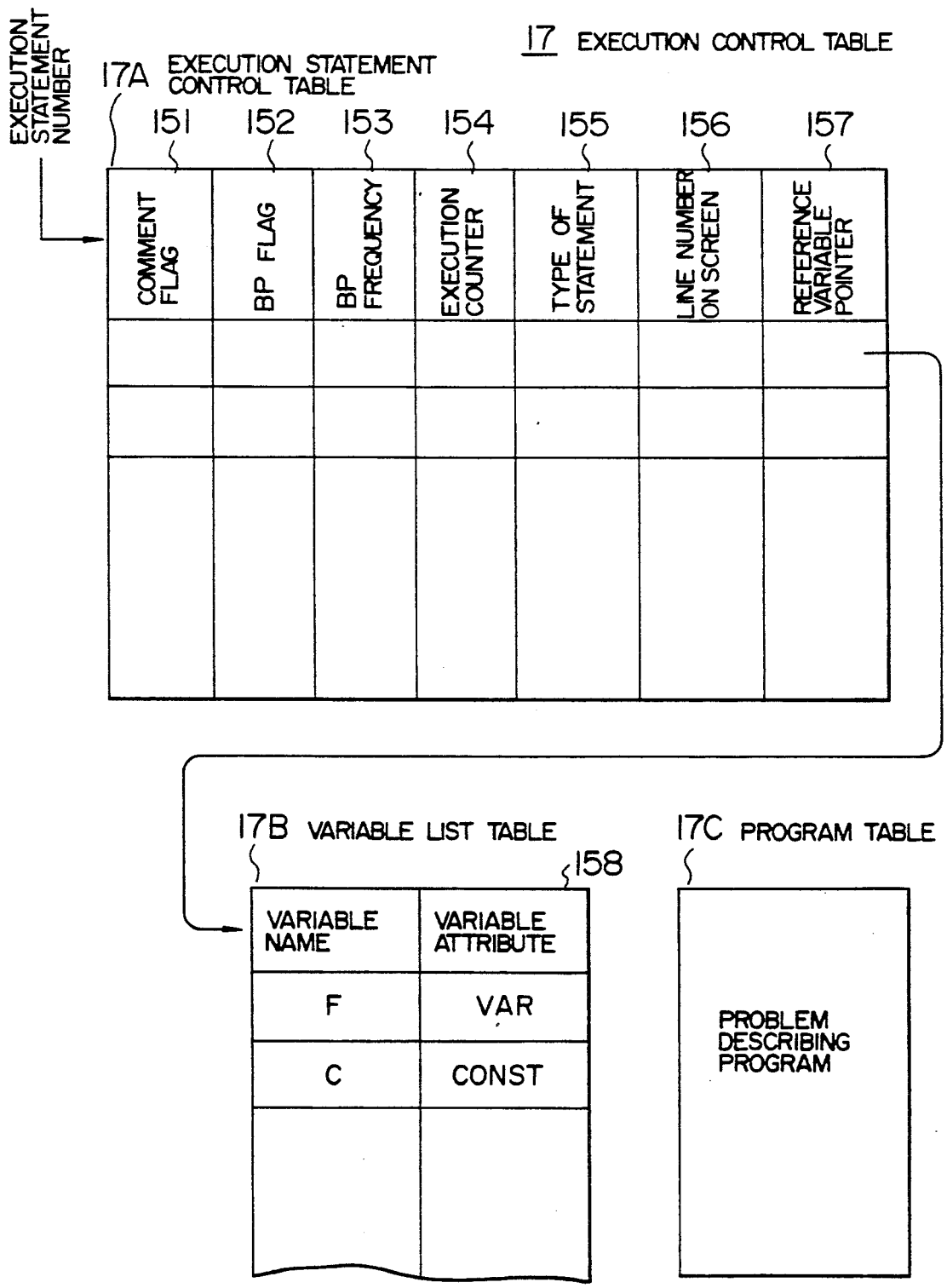
FIG. 7C shows a structure of an execution control table generated by the present invention.

As shown in FIG. 7C, this table contains an execution statement control table (TAB) 17A, a variable list table (NAME) 17B, and a program table 17C which retains the input problem describing program 2. The table TAB 17A retains the following information for each execution statement of the problem describing program 2. The information comprises a comment flag 151 which indicates whether a comment statement which omits the execution has been designated or not, a BP flag 152 which indicates whether it has been designated as the break point (BP), a BP frequency 153 which indicates a rate of actual break to the number of times of passage of the break point, an execution counter 154 which counts the number of times of execution of the execution statement, a type of statement 155 which indicates the type of statement such as a SOLVE statement, assignment statement, input/output statement and iteration control statement, a line number 156 on the display screen which indicates the line position of the execution statement as counted from the beginning of the problem describing program 2, and a reference variable pointer 157 which points to a variable to be updated or set before the execution of the execution statement. The reference variable pointer 157 points to the variable list table 17B which contains the variable names and the variable attributes which are arranged in the order in which the variables are set in the problem describing program 2.

Execution control table generation process 14

Figure 22:
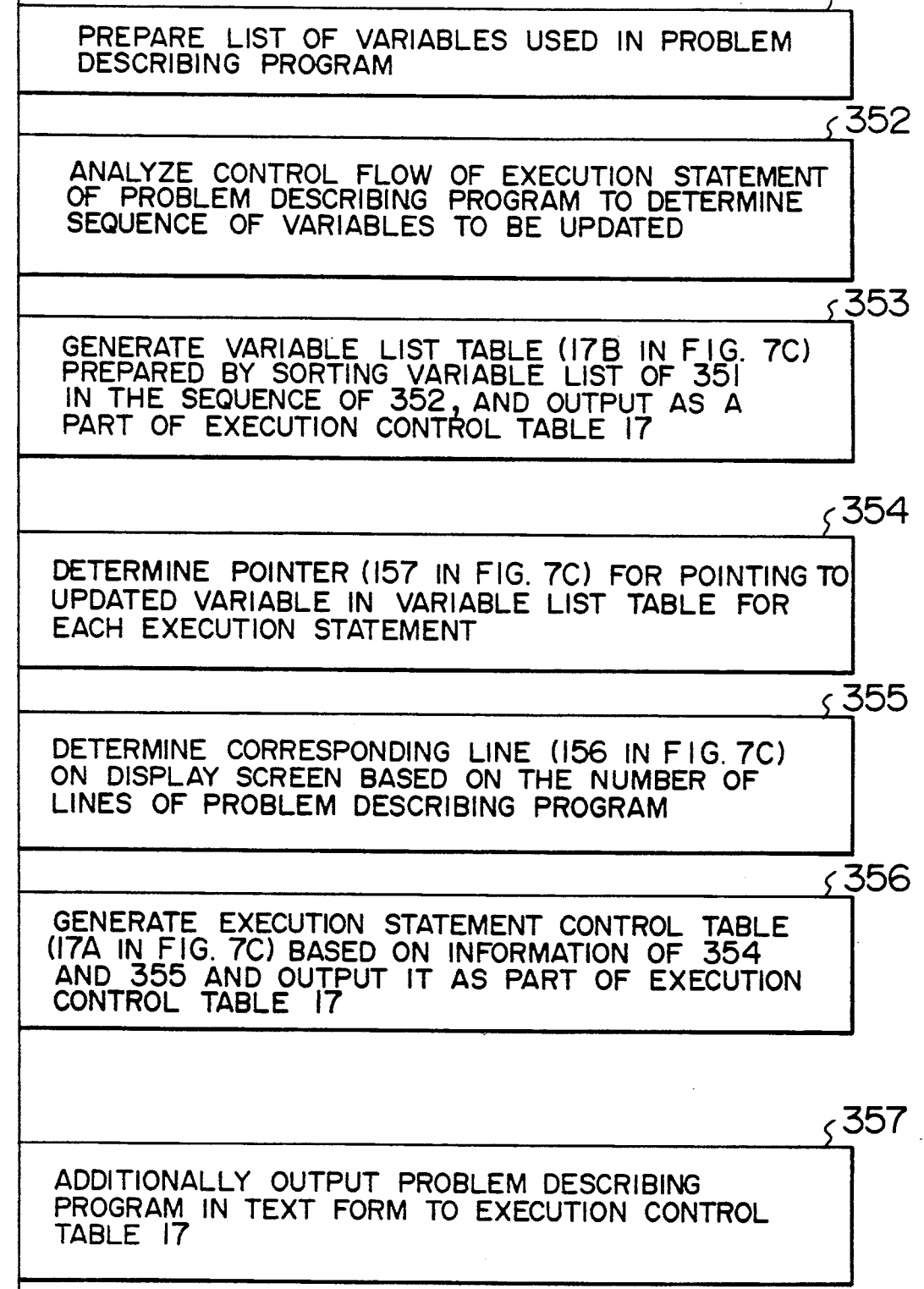
FIG. 22 shows a flow chart of an execution control table generation process (14)

As shown in FIG. 22, a list of the variables used in the input problem describing program 2 is first prepared (step 351). Then, the control flow of the execution statements of the program 2 is analyzed and the order of the variables to be modified by the execution statements is determined (step 352). The list of variables is sorted in this order to prepare the variable list table 17B (FIG. 15), and it is outputted as a part of the execution control table 17 (step 353). Then, the reference variable pointer (157 in FIG. 7C) which indicates the updated variables in the variable list table is prepared (step 354). The line on the display screen which displays the execution statement is determined based on the number of lines of the input problem describing program 2 (step 355). The execution statement control table 17A (FIG. 7C) having both of the above information set therein is generated and it is outputted as a part of the execution control table 17 (step 356). Finally, the problem describing program 2 is registered into the program table 17C (FIG. 7C) in a text form (step 357).

Structure of execution control part 148 (FIG. 7B)

This part is provided for each execution statement of the problem describing program 2. In the prior art method, as shown by 45A in FIG. 4, the CALL statement for the sub-routine is provided in the main program for each execution statement of the problem describing program 2. In the present embodiment, the execution control part 148 shown in FIG. 7B is formed.

The content of the execution control part 148 is described below. The number of the execution statement in the problem describing program 2 is set into the execution control part 148 in a step 143. Assuming that the number is N, the execution control table 17 (FIG. 7C) is looked up using the number N to control the subsequent operations.

First, the execution statement control table 17A is referred to to determine whether the corresponding execution statement has been designated as the comment statement or not (step 149), and if it has not been designated as the comment statement, the CALL statement for the execution statement is executed (step 144). As described above, if the special diagnosis process has been designated for the execution statement, the call statement for calling the sub-routine 48 or 49 (FIG. 7A) therefor is also executed. The execution statement control table 17A is referred to, the color of the corresponding line on the display screen (FIG. 25) of the problem describing program 2 is changed (step 145), and the current execution position is displayed to the user. Then, the execution counter 154 TAB (N. 4) and the reference variable pointer 157 TAB (N. 5) are incremented (step 146). Then, the break point flag TAB (N. 2) is referred to to determine whether the break point has been designated, and if it has been designated, whether a frequency condition of the break point (MOD (TAB (N. 4), TAB (N. 3))=0) is met or not is checked based on the break point frequency TAB (N. 3) and the execution counter TAB (N. 4) which indicates the number of times of passage of the line. If the condition is met, the debug process 8 (DBGCTL in the present example) is called (step 147). If the condition is not met, the simulation program 18 is executed.

In the present embodiment, the simulation program is executed interactively. If the control is transferred to the debug process 8 at the break point in a batch fashion, the step 145 is not necessary.

After the execution of the debug process 8, the control is returned to the simulation program 18.

Debug process 8

Prior to the explanation of the debug process 8, the relationship between the process 8 and the simulation program 18 is explained in connection with the flow of control in the execution in order to clarify the operation and use of the debug process 8.

In the execution of the simulation program 18, as explained in FIG. 7A, the execution control table 17 is applied to the debug process 8 at the beginning of the simulation program 18 (process 161), and the debug process 8 displays the problem describing program 2 in the input table 17 on the display screen 1A so that the break point is set (B) and the change of the execution statement to the comment statement is designated (C) prior to the execution (process 162). The display screen for the problem describing program 2A of FIG. 3 and the example of designation are shown in FIG. 25. As seen from FIG. 25, the user sets the break points (enters B) 171, designates the break frequency 172 or designates the comment statement (enters C) 173 through the keyboard 1B by using the parentheses [ ] for entering, in the scheme block 500A comprising execution statements of the program 2A of FIG. 3, the designation B (171) for designating the statement as the break point, the break frequency condition 172 and the designation 173 (C) for changing the statement to the comment statement. The designation is valid until it is subsequently changed. In the present example, the control is transferred to the process at the break point each time the SOLVE statement 39 for solving the partial differential equation is executed four times in the iteration block 174 in which the time step is updated, and the PRINT statement 39A is changed to the comment statement and the execution is suppressed.

The operation flow is now actually followed. The simulation program 18 in FIG. 7A applies the execution control table 17 of FIG. 7C to the debug process 8 in the execution control table input process 161. Of those, the type of statement 155, corresponding line position 156 on the screen, reference variable pointer 157, variable list table 17B and program table 17C are preset. In the display/condition set portion 162 of FIG. 7A, the scheme block of the problem describing program 2 is displayed (FIG. 25) to allow the user to designate the statement to be used as the break point (BP), the line of the statement to be changed to the comment statement and the frequency of break point so that they are set into a comment flag 151, a BP flag 152 and a BP frequency 153 of the table 17A of FIG. 7C. Then, the simulation is executed. The execution control part 148 for the execution statement of the problem describing program 2 skips the call (144 in FIG. 7B) of the subroutine for the execution statement if the execution statement has been changed to the comment statement, that is, if the flag 151 of FIG. 7C has been set in the corresponding line, and executes the execution statement if it has not been designated as the comment statement (processes 149 and 144 in FIG. 7B). The color of the corresponding line or the display screen is changed to display the current execution position to the user (process 145), the execution counter 154 of FIG. 7C is incremented (step 146), and the designation 152 of the break point and the break frequency condition 153 are checked (step 147A), and if the condition is met, the control is transferred to the debug process (DBGCTL) 8 (step 147B).

Figure 23:
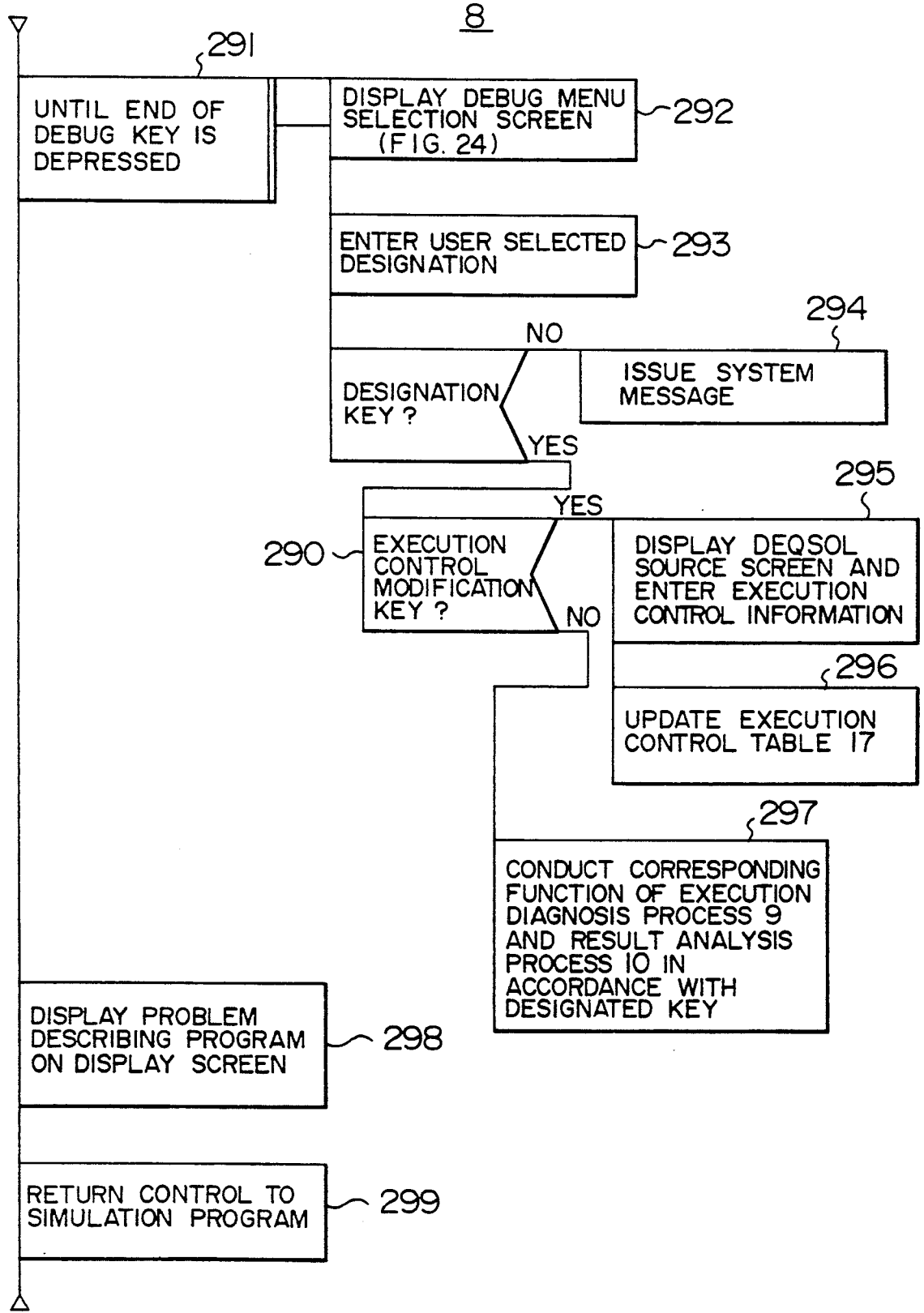
FIG. 23 shows a flow chart of a debug process (8)

The operation of the debug process 8 is explained with reference to the flow chart (FIG. 23). When the debug process 8 which has received the control at the beak point repeats the following processes 292-297 until the end of debug key is depressed (step 291). The debug menu selection screen 180 shown in FIG. 24 is displayed on the display 1A (step 292). The user selection is inputted through the screen (step 293). If it is not a designation key, a system message is issued (step 294) and the system waits for a reentry. If it is the designation key, the process is different depending on whether it is the execution control change key (184 in FIG. 24) or not step 290). If it is the execution control change key, the execution statement screen (FIG. 25) of the high level language program is displayed and a change portion of the execution control information is inputted (step 295). The execution control table 17 (FIG. 7C) is changed in accordance with the input (step 296). If it is not the execution control change key, the corresponding function of the execution diagnosis process 9 or the result analysis process 10 is called in accordance with the content of the designated menu key, and it is executed (step 297). If the end of debug key is depressed, the scheme block (FIG. 25) of the problem describing program 2 is displayed on the display 1A (step 298) and the control is returned to the execution statement which is next to the execution statement which has transferred the control to the debug process at the break point of the simulation program 18 (step 299).

The list of FIG. 24 is now explained. In the present invention, the simulation program 18 is broken immediately after the simulation program 18 has executed the process requested by a statement in the problem describing program 2. Therefore, it is possible to break the simulation program 18 when the physical quantity is updated by the process requested by the execution statement. Whether the calculation process is normally carried out or not is verified by referring the updated quantity and diagnosing the matrix used for the updating. The execution control change key 184 of FIG. 24 changes the designation of the break point and the change to the comment statement, in addition to the extraction of the variable, the graphing, of the variable, the change of the variable, the verification of the matrix, and the check of the stability of the scheme. When this menu is selected, the scheme block of the problem describing program 2 is displayed as shown in FIG. 25 and described in the above flow, and the execution control table 17 of FIG. 7C is changed in accordance with the change of the setting.

In the debug process, all information including variable and matrix information are received from the simulation program under execution. Accordingly, various debug menus may be provided by the execution diagnosis process 9 and the result analysis process 10 to be described later. When the end of the debug process is designated, the control is returned to the simulation program (that is, the sub-routine is terminated), and the simulation is resumed until the break condition is met at a certain line.

Execution diagnosis process 9

Figure 26:
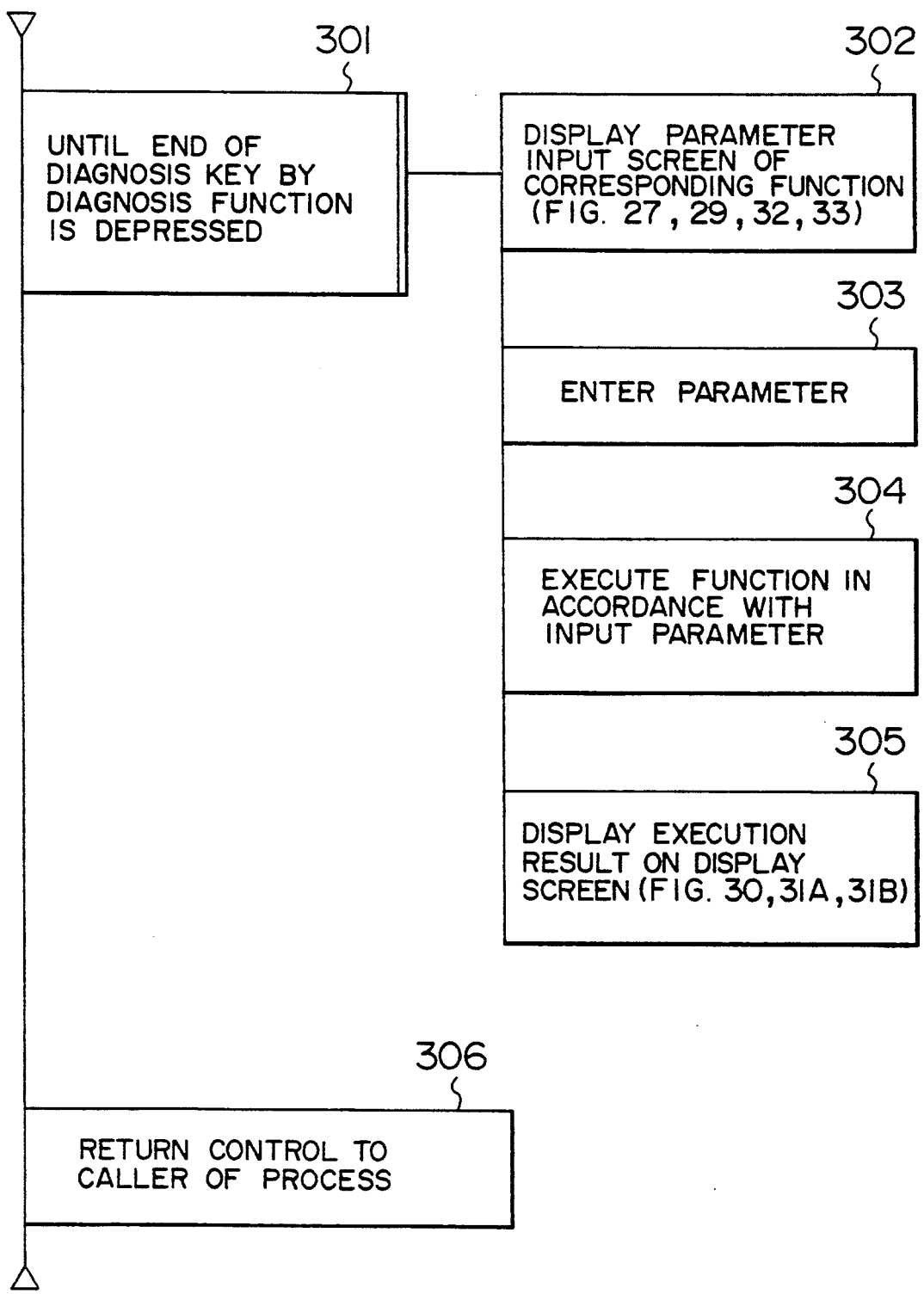
FIG. 26 shows a flow chart of an execution diagnosis process (9)
Figures 27, 28:
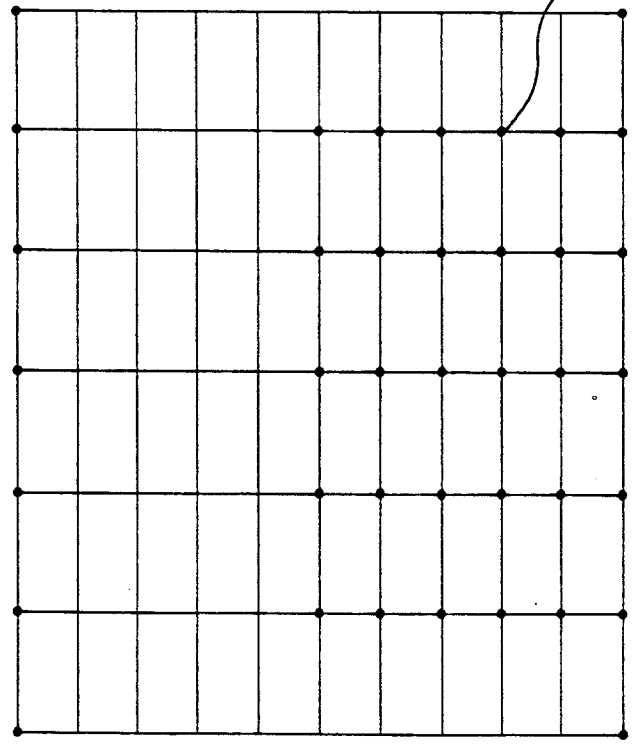
FIG. 27 shows an example of a parameter input display screen of the execution diagnosis process (9)
FIG. 28 shows an example of a display screen of a result of the execution diagnosis process.
Figures 29, 30:
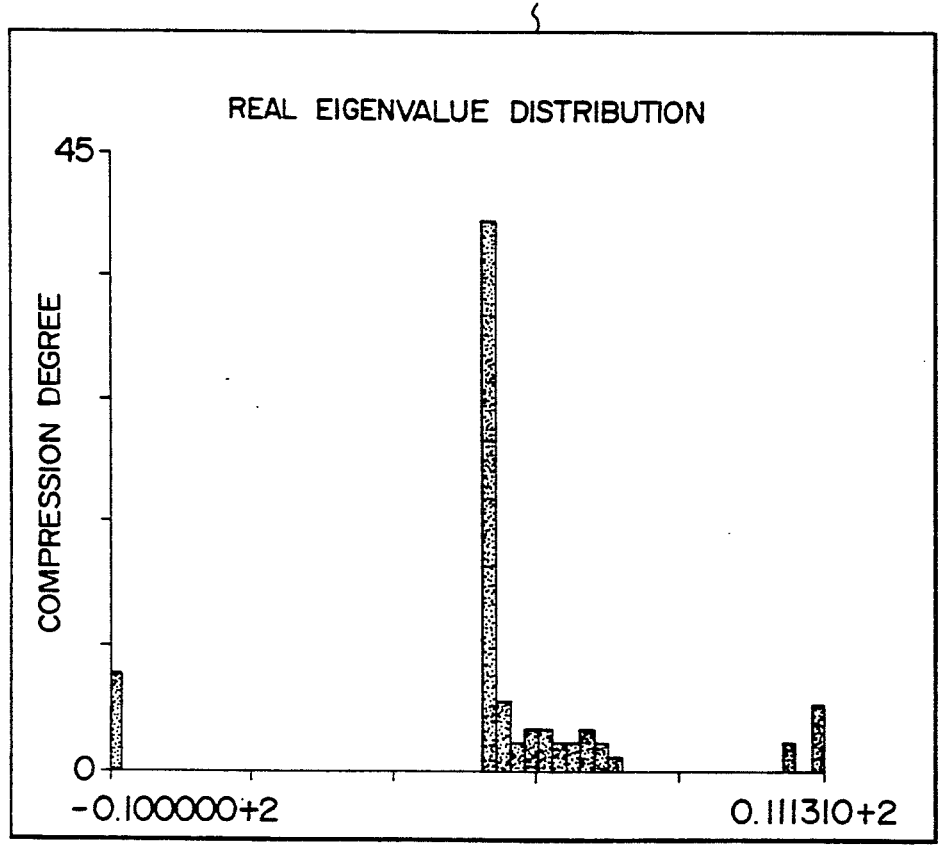
FIG. 29 shows an example of another parameter input display screen of the execution diagnosis process (9)
FIG. 30 shows an example of a display screen of a result of the execution diagnosis process.

This process is started by a step 297 of FIG. 23 during the debug process as shown in FIG. 26 and the following process is repeated until the end of diagnosis key is depressed by the corresponding diagnosis function (step 301). A parameter input screen for inputting a parameter required for the execution of the function is displayed on the display 1A (step 302). The screen format may differ depending on the function but it may be a parameter input screen 191 of FIG. 27 for a diagonal dominance property verification function, a parameter input screen 280 of FIG. 29 for a real eigenvalue spectral function, a parameter input screen 260 (FIG. 32) for a variable graphing function, or a parameter input screen 270 (FIG. 33) for coefficient proportional extraction of a matrix verification function. A parameter is inputted through the screen (step 303) and the function is executed in accordance with the input parameter (step 304). The execution result is displayed on the display 1A. In the diagonal dominance property function, a screen 192 of FIG. 28 is displayed, and in the real eigenvalue spectral function, a screen 281 of FIG. 30 is displayed. The parameter is changed and the function is executed as many times as are required. When the end of diagnosis key is depressed, the control is returned to the caller of the process (step 306).

The execution diagnosis process 9 primarily extracts the information for diagnosing the property of the matrix generated by the discretization of the partial differential equation included in the SOLVE statement of the problem describing program 2 when the physical quantity is changed. The process is divided into a process for directly verifying the component values of the generated matrix and a process for verifying the eigenvalue which represents the property built in the matrix. The matrix is retained in the generated simulation program 18 by a specific array name and a given form. In the present process, it is received and the above two processes are applied thereto. In the assignment statement by the explicit algorithm scheme, the matrix is not generated superficially, but the assignment statement is expressed in a matrix form as an operation for the old physical quantity when the sub-routine generation process 13 for the special diagnosis shown in FIG. 1 is utilized. It is thus received and the above two processes are applied thereto.

As the method for directly verifying the component values, the present invention involves a method for simply extracting the component value as well as a line which meets (or does not meet) a condition formula such as the diagonal dominance property, and a method for displaying the component values by a visual pattern. Some of them are explained below.

FIG. 28 shows an example of display when a condition formula is given. The diagonal dominance property is a condition of comparison of magnitudes of a diagonal component and a non-diagonal component, and it is an important factor to determine whether the discretization is reasonable or not in the numerical calculation. The degree is designated as a weight $\alpha$ shown in the parameter input screen 191, and a grid point corresponding to the line of the matrix which meets the condition formula 194 is displayed by a grid number or a coordinate position, or a marker 193 is displayed on the grid on the region as shown in the result display screen 192 to indicate the position. In this manner, the user may determine in what portion of the region the discretization is not reasonable (or is reasonable).

Figure 31B:
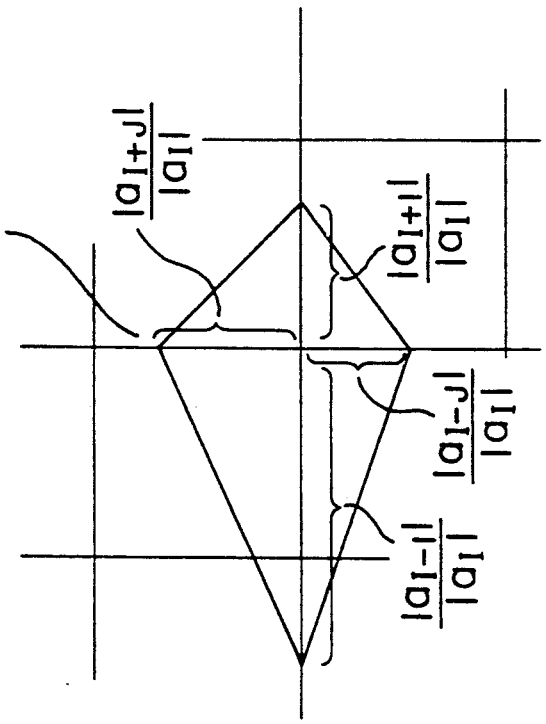
FIG. 31B shows a further example of the display screen of the result.
Figure 31A:
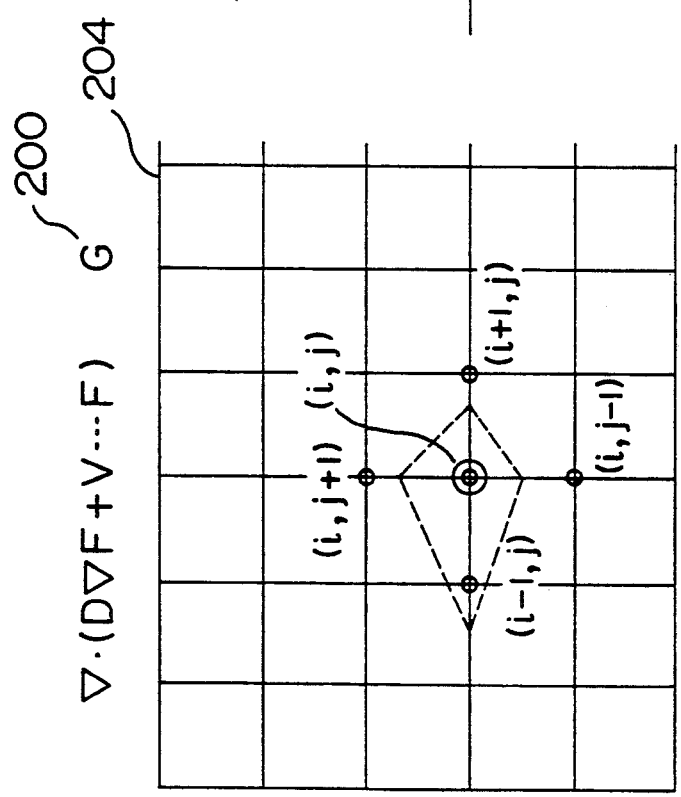
FIG. 31A shows another example of the display screen of the result.

FIGS. 31A and 31B show an example of display of the component values of a coefficient matrix of a matrix equation as a visual pattern. FIG. 31A shows an example of the display screen and FIG. 31B illustrates a principle. The partial differential equation 200 is represented by a group of linear equations (I=1, 2, ...) in the form 601 of FIG. 2B, and they are combined to a matrix display 602 (FIG. 2B), where F represents a variable and a represents a coefficient. A degree of influence to each grid point from surrounding grid points may be represented by a length 203 toward the corresponding grid point as a relative value $|a_{I-1}|/|a_I|$ for a diagonal component $a_I$. In this manner, the grid point having a strong effect and whether the diagonal dominance property is met can be visually verified by the size of the polygon and the distortion thereof.

As shown in FIG. 30, the number of real eigenvalues of the matrix under consideration, the actual eigenvalue and the overall distribution are displayed by the graph so that the correctness of discretization and the stability of the numerical calculation algorithm scheme are verified.

While the differential method data (normal mesh) is used in the present embodiment, the present invention is equally applicable to the limited element method data (any mesh).

Result analysis process

Figure 34:
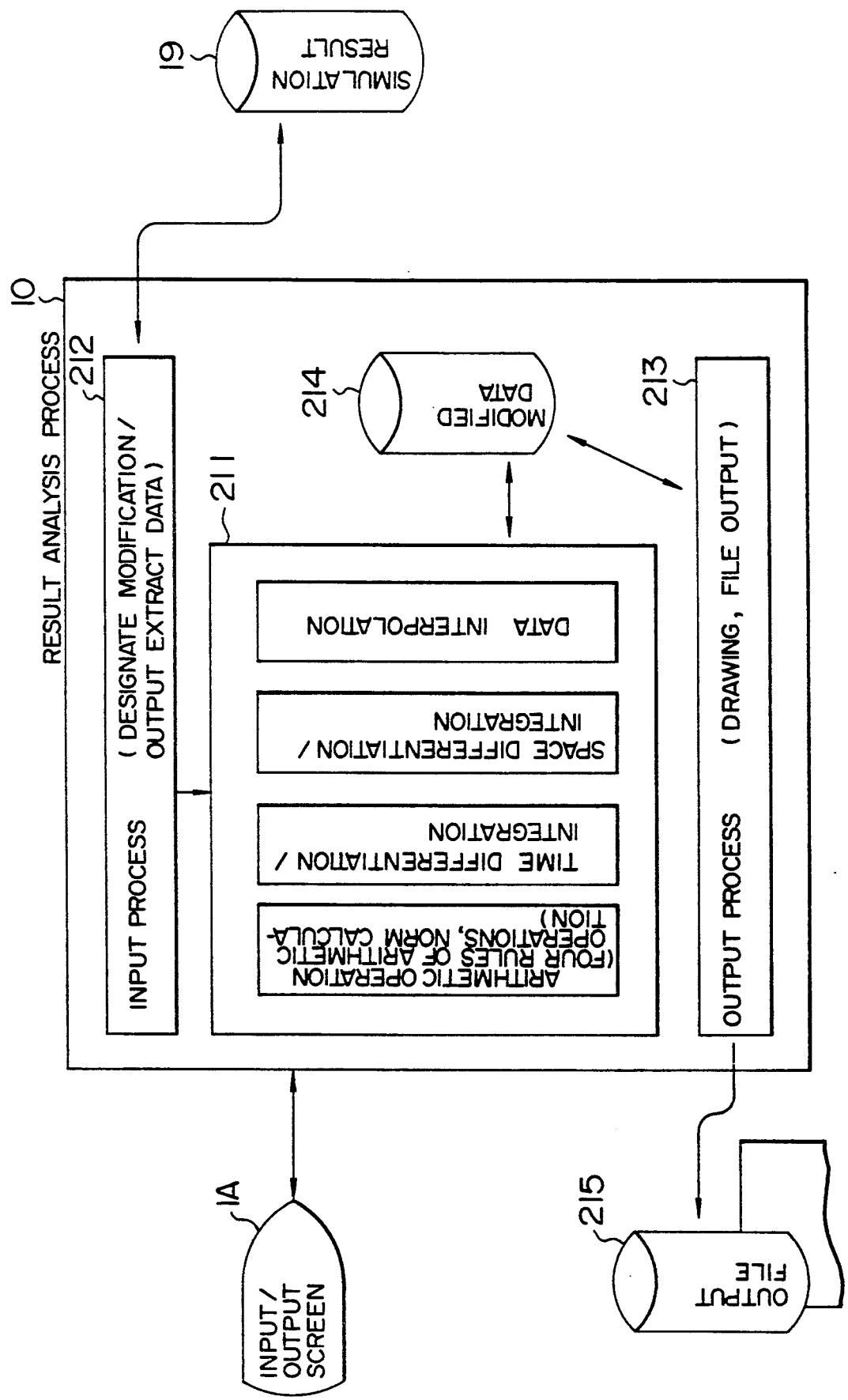
FIG. 34 shows a structure of a result analysis process (10)

The process flow of the result analysis process 10 of FIG. 1 is now explained. FIG. 34 shows a configuration of the result analysis process 10. In the present process, the simulation result 19 in the time space domain derived by the execution of the simulation program 18, the name of variable to be analyzed, the method of modification and the output method are inputted, the corresponding data in the simulation result 19 is inputted in the input process 212, they are modified by the modification method designated by the data modification process 211, and the modified data is outputted to the input-/output screen 1A or the output file 215 as the graphic data or file data in the output method designated by the output process 213. The data modification process 211 comprises an operation process such as arithmetic operations of four rules or norm calculation, and time differentiation and integration process, space differentiation and integration process and data interpolation process for the input data.

Figure 35:
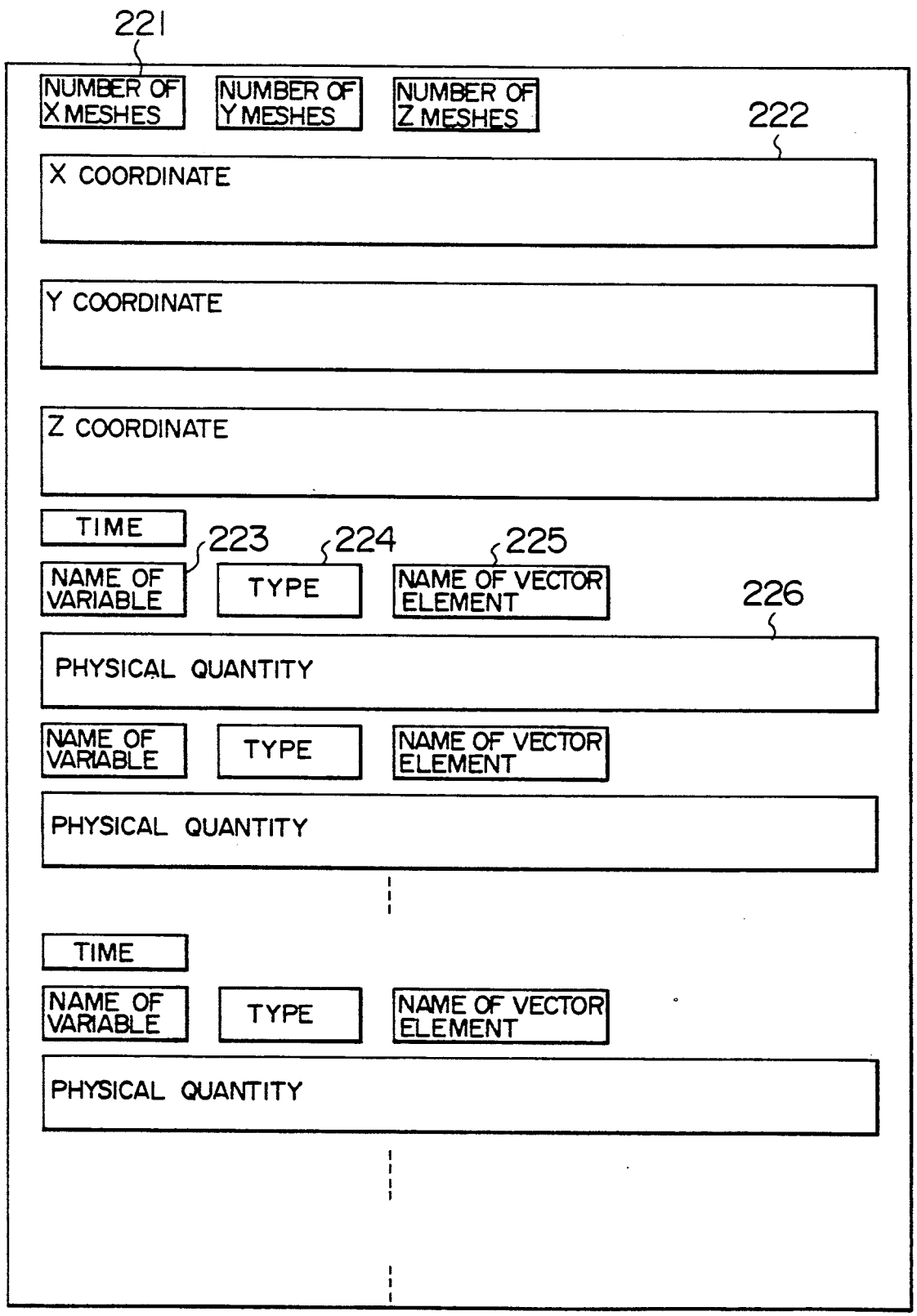
FIG. 35 shows an example of an input in the result analysis process.
Figure 36A:
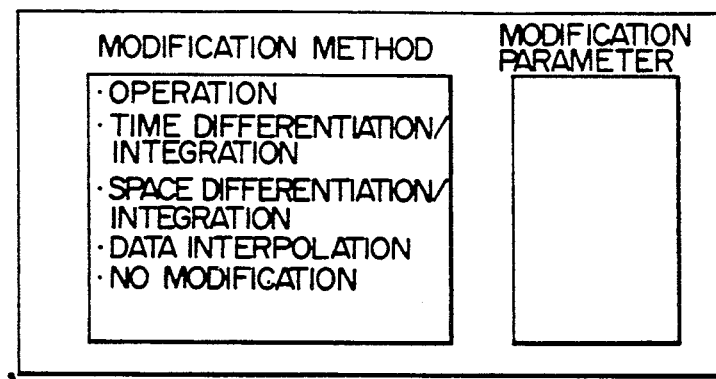
FIG. 36 shows an example of an operation designation menu in the result analysis process (10)
Figure 36B:
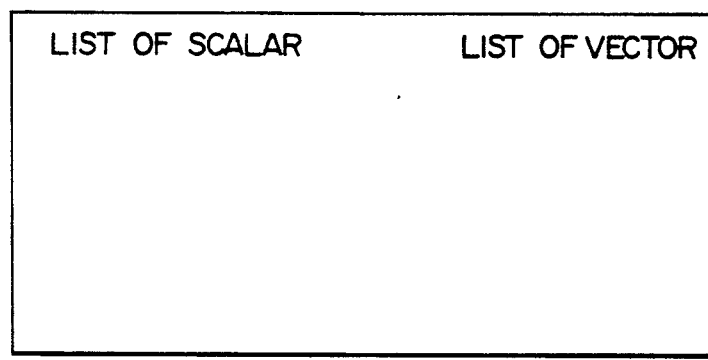
Figure 36C:
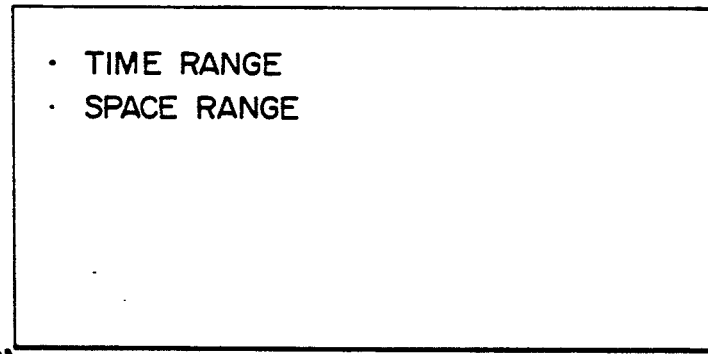
Figure 36D:
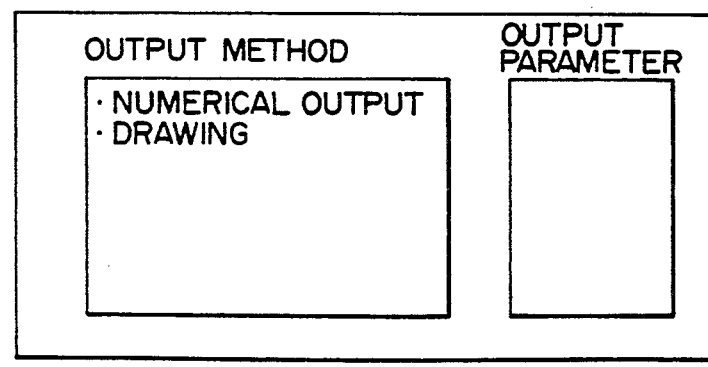

The input simulation result 19 is the calculation result of the simulation program 18 and comprises a coordinate value of a grid point at which the calculation was carried out as an independent variable, and the name and value of the physical variables derived at the respective grid points as dependent variables. One example thereof is shown in FIG. 35. The number of meshes 221 along the coordinate axis, the coordinate values 222 of the grid points and the numerical data of the physical quantities at the respective grid points of the space region and at the respective meshes are included for each time. The data at each time comprises the name 223 of physical variable, a type 224 indicating whether it is a scalar quantity or a vector quantity, the element variable name 225 if it is the vector quantity and the numerical data 226 of the physical quantities of the respective variables. The numerical data for a plurality of physical variables of the same time are stored in the same form. In the present embodiment, the regular grid mesh (differential method) data format is used although the data format by the non-regular mesh (such as the limited element method) may be used.

FIG. 36 shows the format of the designation content inputted from the display 1. The designation content comprises data modification method designation 231, data name designation 232, data extraction range designation 233, and modified data output designation 234. The data modification method designation 231 designates operation process modification which comprises the arithmetic operations of four rules for the variables and the norm calculation, the time differentiation and integration process modification, and data interpolation process modification for the time or space of the variable. When a modification method is designated, the type of modification parameter which is inherent to the modification method is determined and it is designated. For example, the method of numerical differentiation and integration, or the method of data interpolation such as linear, spline or Lagrange, is determined. The data name designation 232 designates the (dependent) variable to be modified. It may be selected from the scalar quantity list and the vector quantity list in the simulation result 19. The data range designation 233 designates the range of the independent variable to be extracted. It designates the time range and the space range. The output designation designates the numerical output or the graphic output in outputting the extracted and modified data. When the output method is designated, the type of output parameter which is inherent to the output method is determined and it is designated. For example, if it is the numerical output, the format thereof is designated, and if it is the graphic output, the graphic specification such as the type of graph or the view point is designated.

Figure 37:
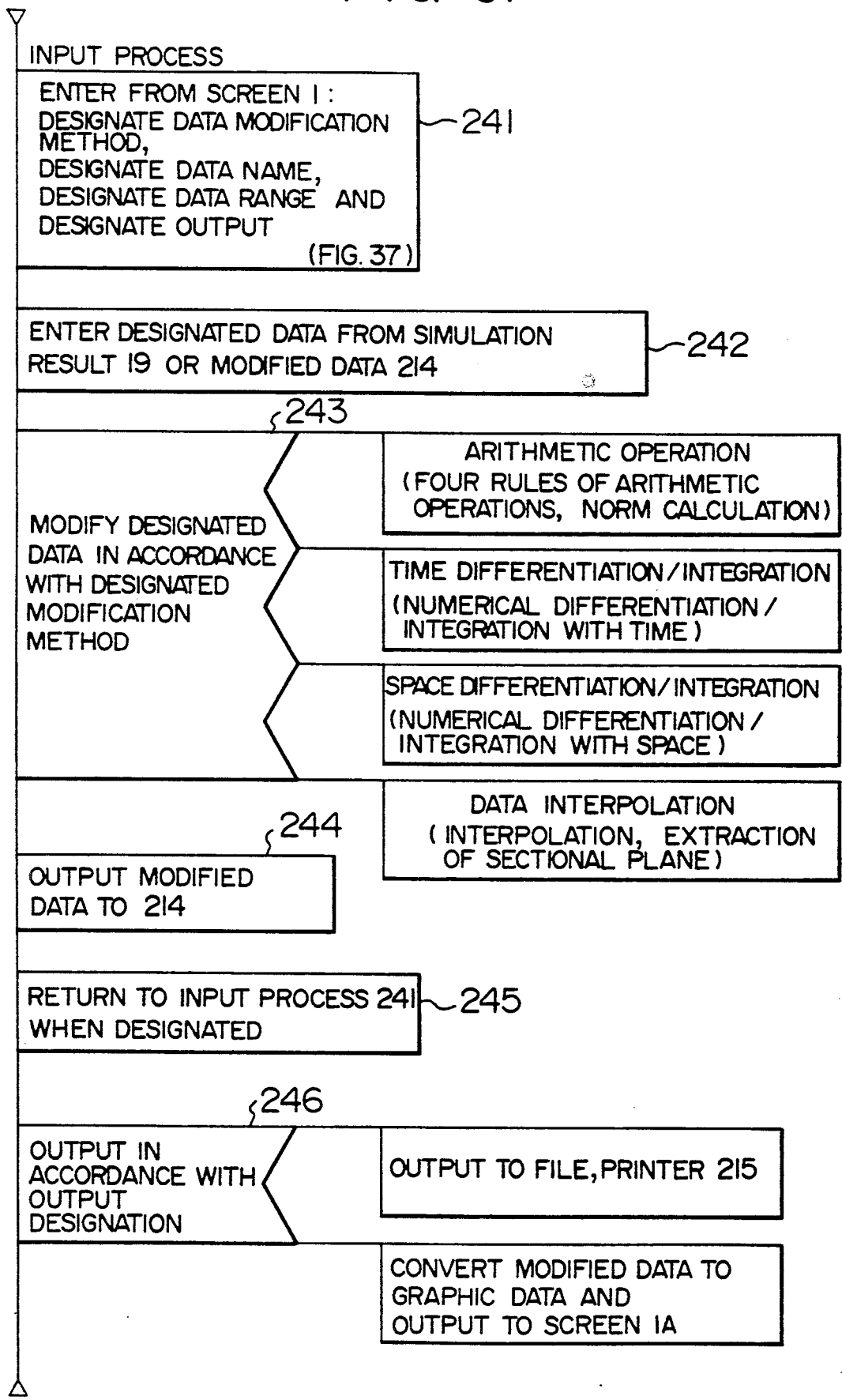
FIG. 37 shows a flow chart of the result analysis process (10)

The operation flow of the result analysis process is shown in FIG. 37.

The input shown in FIG. 36 is first inputted from the screen 1A in the input process 212 (FIG. 34) (step 241). The input method may be selected from the menu of the designation items which the system displays on the screen, and the value is designated. Since each designation item is not determined independently, it is possible to prevent the erroneous designation by the user if the system displays only the menu which is permitted to the input designated items of the designation items. The designated data is then inputted from the simulation result 19 or the modified data 214 (step 242). Then the designated data is modified in accordance with the designated modification method (step 243). The modified data is in one of three forms, that is, the variable value defined on the same grid point or mesh as that of the simulation result (FIG. 35), a portion thereof, and a scalar quantity having a single value. The arithmetic operations of four rules, the differentiation operation and the data interpolation result in the first or second data form, and the norm calculation and the integration result in the third data form. The modified data is outputted to the modified data file 214 of FIG. 34 (step 244) If it is the first or second form data, it may be remodified and the process may return to the input process 241 if so designated (step 245). In this manner, the modified data 214 generated in the course of the process is also the subject of the input data. Finally, it is outputted to the file or the printer 215, or converted to graphic data such as a line pattern or image and outputted to the display 1A, in accordance with the output designation.

The embodiment of the result analysis process has been described. It is characterized by the provision of the process (tool) for modifying the data to the information which facilitates the determination of the simulation result, and the provision of the ability to permit the recursive use thereof

Overall operation in the debug process

Finally, the operation flow of the combination of the debug process 8, the execution diagnosis process 9 and the result analysis process 10 is explained. In the present operation flow, the user interactively intervenes into the generated simulation program to carry out the debugging, execution diagnosis and result analysis.

The simulation program 18 permits the intervention to the simulation program for each statement of the problem describing Program 2 by the break point generation process 16 and the execution control table generation process 14. The intervention is carried out by displaying the execution statement portion (scheme) of the problem describing program 2 at the beginning of the execution of the simulation program 18 as shown in FIG. 25 and setting the break point or designating the change to the comment for each line. The end of execution line and the current execution line may be traced by the change of colors of the lines of the problem describing program displayed as shown in FIG. 25. When the break point condition is met, the transfer and the variable in the program are transferred to the debug process 8. The debug process 8 displays the function selection screen of the debug menu shown in FIG. 24 to allow the user to select the debug, execution diagnosis or result analysis. When the end of debug is commanded, the control and the variable are returned to the original positions of the simulation program from the debug process, and the simulation is continued.

Figure 38:
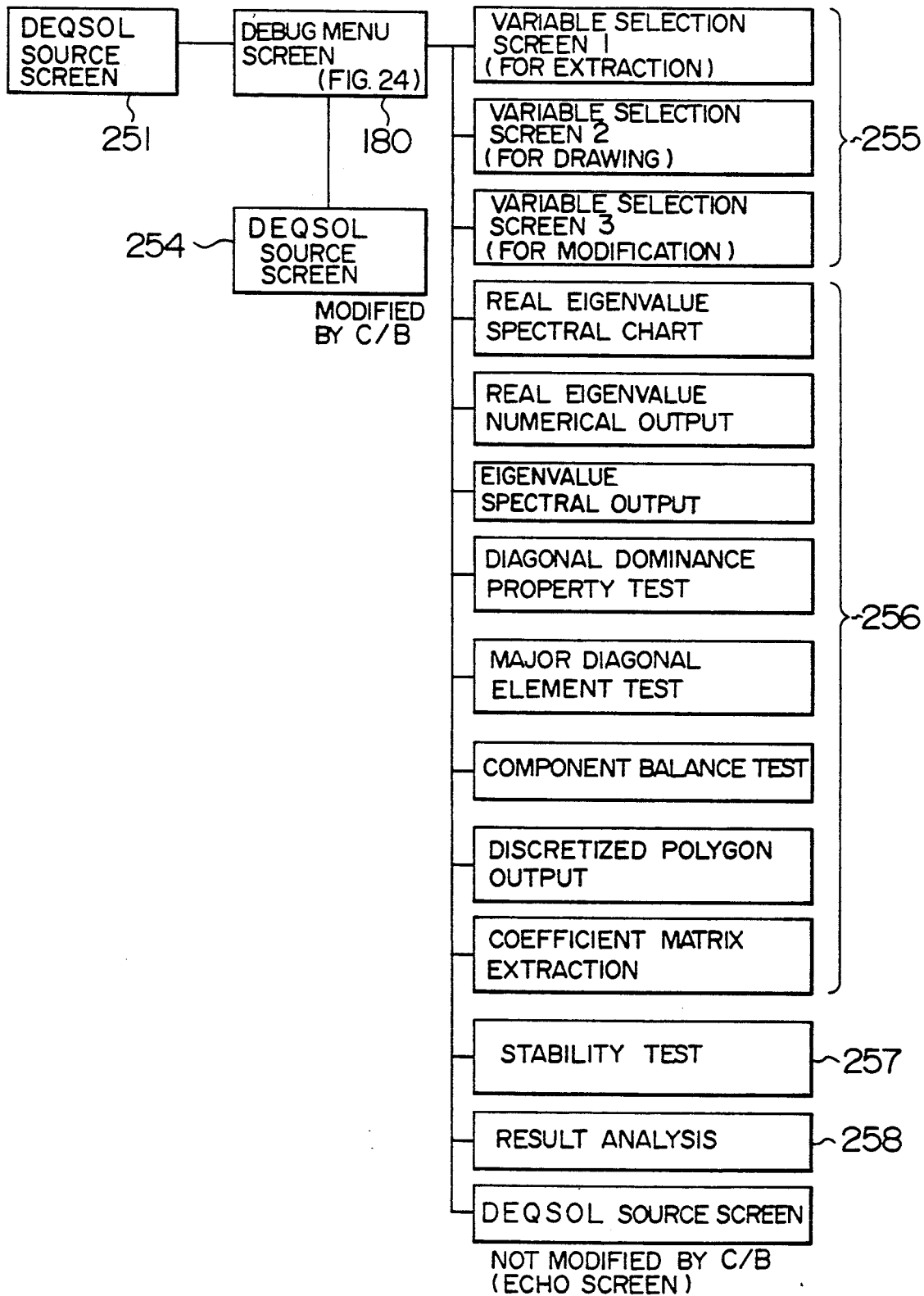
FIG. 38 shows various display screens in the execution of the simulation program.

FIG. 38 shows the change of screen of the display 1 when the simulation program is executed. The problem describing program 2 is named DEQSOL. In the execution of the simulation program 18, the DEQSOL source screen 251 is displayed as the C/B designation screen. When the control is transferred to the debug process 8 at the break point, the debug menu screen 180 (FIG. 24) for selecting the function is displayed. As shown in FIG. 24, the debug menu 180 comprises a variable extraction, graphing and modification function 181, a result analysis function 183, a matrix verification function 182, a scheme verification function 185, a DEQSOL execution control modification function 184 and a residual error detection function 1801. When a function of the debug menu is selected, that is, when a selection symbol S is inputted in the parentheses of the debug menu selection screen of FIG. 24, the parameter setting screen (255-258 in FIG. 38) for setting the parameter which is inherent to the function is displayed on the screen.

For example, when 181 of FIG. 24 is selected, the parameter setting screen 255 of FIG. 38 is displayed, when 183 of FIG. 24 is selected, the parameter setting screen 258 of FIG. 38 is displayed, when 182 of FIG. 24 is selected, the parameter setting screen 256 of FIG. 38 is displayed, and when 185 of FIG. 24 is selected, the parameter setting screen 257 of FIG. 38 is displayed in order to guide the inputting of the parameter of the function.

If the result analysis function 183 of FIG. 24 is selected, the control and the internal variables are transferred to the result analysis process 10 described above, and if the matrix verification function 182 or the scheme verification function 185 of FIG. 24 is selected, they are transferred to the execution diagnosis process 9 so that the interactive execution of the process from the simulation program is permitted. Since the debug process receives all variables from the simulation program, it is easily attained by the number of transfers to each process.

Some examples of the transition of the screen and the operation flow when the debug menu of FIG. 24 is selected are now explained.

Figure 32:
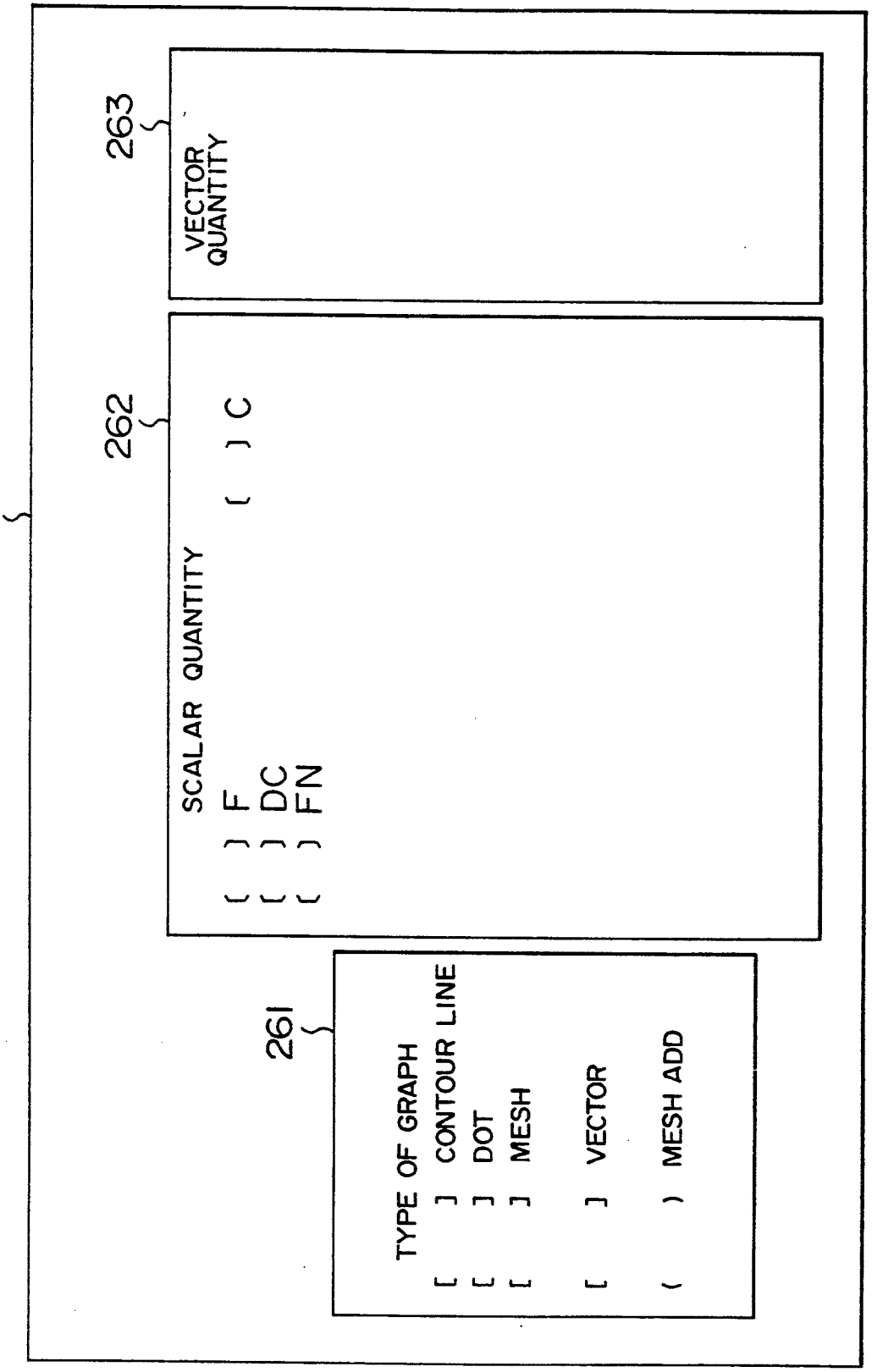
FIG. 32 shows another example of the parameter input display screen in the execution diagnosis process (9)

The debug menu 181 of FIG. 24 extracts (displays several), graphs and modifies the variable received from the simulation program. For example, when the variable graphing function of the debug menu 186 is selected, the graphing function parameter screen 260 of FIG. 32 is displayed. The parameters which determine the graphing are the type of graph 261 and the names 262 and 263 of the variables to be drawn. The debug process 8 detects the variable in which a significant value has been set at the break point and the attribute (scalar or vector) thereof by referring to the execution control table 17, and displays the list of variables as shown by 262 and 263 in FIG. 32. When the user selects the type of graph and the variable name, the desired graph is displayed.

When the coefficient matrix extraction menu 189 of the matrix verification function 182 of FIG. 24 is selected, the coefficient matrix extraction parameter screen 270 shown in FIG. 33 is displayed and a coefficient matrix at a desired position is displayed by designating the grid point numbers 271 and 272 as the output regions and the distance 273 of the coefficient from the major diagonal line and the grid point number addition 274 as the output option. When the diagonal dominance property test is selected, the output shown in FIG. 27 is produced, and when the discretized polygon output is selected, the output shown in FIG. 31A or 31B is produced.

When the real eigenvalue spectral distribution 187 of the matrix verification function of FIG. 24 is selected, the eigenvalue for the matrix given at the break point is calculated and the result thereof is displayed as shown in FIG. 29. When the upper and lower ends 282 of the graph and the division number 283 are designated to graphically display it, a bar graph 281 (FIG. 30) is displayed.

Several examples have been described. When the debug menu is selected, the variable and the matrix information at the break point of the simulation program are displayed after they have been modified to the form which facilitates the user's decision, by the combination of the debug process 8, the execution diagnosis process 9 and the result analysis process 10 so that the execution status of the simulation program and the correctness of the calculation can be grasped.

The overall configuration, the contents of the functions of the processes and the operation flow of the embodiment of the present invention have been described. Some modifications of the present invention are now described.

In the present embodiment, the analysis of the regular mesh (differential method) is used. The present invention is equally applicable to other analysis method such as a non-regular mesh or arbitrary mesh (limited element method).

In the present embodiment, the break point at which the simulation program is intervened is interactively set during the execution. Alternatively, the break point may be set in the generation of the simulation program 18 by introducing the term which explicity commands it on the problem describing program 2, or the user may designate in the problem describing program 2 as a specific operation mode of the program generation process 7, and when the mode is designated, the simulation program 18 may be generated by assuming that the break point has been designated to all execution statements in the program 2. The setting and modification in the interactive execution may be combined with the above method.

In the present embodiment, the execution diagnosis process and the result analysis process are utilized from the generated simulation program. Some processes may require many computer resources (memories and CPU) in the operation. Thus, the program which dynamically changes the variation of the debug menu of the user and the resource load during the execution of the generated simulation program may be generated by permitting the user to designate only those which are utilized in the process in the program generation process.

In the present embodiment, the control is transferred to the debug process 8 after the execution statement of the problem describing program 2 has been executed. The process may be modified so that the control is transferred to the debug process 8 immediately before the execution of the designated execution statement.

In accordance with the present invention, in the execution of the simulation program automatically generated from the problem describing program, the break point may be set at any execution statement of the problem describing program so that the intervention to the simulation program under execution is permitted. Accordingly, the trace of the operation of the generated simulation program and the internal information such as matrix can be extracted and the reliability of the solution desired by the execution of the simulation program can be verified.

In accordance with the present invention, the user who has little ability to structure the algorithm can readily select the algorithm from the existing database, the algorithm written by the high level language can be simply described, the anticipated error in the calculation can be previously diagnosed by the knowledge obtained by the numerical analysis and the comparison before the execution of the described algorithm, the program in the high level language can be visually confirmed by the shape information, the arithmetic formula information and the relationship therebetween and can be quoted in programming, a simulation program which can be executed by a conventional FORTRAN computer can be generated from the high level language program, and the generated simulation program may be used for the debugging during the execution, the diagnosis of the calculation and the analysis of the result. Thus, substantial reduction of the process of the numerical simulation and the improvement of the reliability are attained.

What is claimed is:

1. A method for generating a program, by a computer, for simulating a physical phenomenon governed by a partial differential equation, comprising the steps of:
   (a) selecting, in response to a set of search keys input by an operator, a desired numerical calculation algorithm scheme from a plurality of numerical calculation algorithm schemes for numerical simulation of physical phenomena governed by partial differential equations, the set of search keys describing attributes of the desired numerical calculation algorithm scheme and being selected by the operator from a plurality of search keys describing attributes of the plurality of numerical calculation algorithm schemes;
   (b) selecting a program portion describing the selected numerical calculation algorithm scheme from a plurality of stored program portions describing respective ones of said plurality of numerical calculation algorithm schemes;
   (c) inputting a program portion describing at least a region of calculation and a boundary condition, the region of calculation and the boundary condition being designated by the operator; and
   (d) generating, from a problem describing program formed by said selected program portion and said input program portion, a simulation program for obtaining, in accordance with said selected numerical calculation algorithm scheme, a solution of the partial differential equation which meets the boundary condition in said region of calculation.

2. A method for generating a simulation program according to claim 1, further comprising the step of:
   (e) substituting a variable designated by the operator for a variable used in said selected program portion;
   wherein said program generating step (d) includes the step of generating the simulation program from said problem describing program formed by said selected program portion and said input program portion after the substituting step (e) has been performed.

3. A method for generating a simulation program according to claim 1, wherein the set of search keys includes at least a search key relating to an application field of the desired numerical calculation algorithm scheme, a search key relating to a feature of the application field, a search key relating to a dimension of a simulation region to which the desired numerical calculation algorithm scheme is to be applied, and a search key relating to a restriction on an application of the desired numerical calculation algorithm scheme.

4. A method for generating a program, by a computer, for simulating a physical phenomenon governed by a partial differential equation, comprising the steps of:
   (a) graphically displaying information described by a string of program statements which forms part of a problem describing program and describes a partial differential equation to be solved, a region of calculation, and a boundary condition, the information being graphically displayed in response to input by an operator of said string of program statements, the step (a) including the sub-steps of:
   (a1) displaying a shape of the region of calculation in response to program statements describing the region of calculation in the input string of program statements, and
   (a2) displaying a mathematical formula relating to a portion of said region of calculation at a position corresponding to a display position of said portion of the region of calculation in response to a program statement describing said mathematical formula in the input string of program statements; and
   (b) in response to input by the operator of another string of program statements necessary to complete said problem describing program, generating a simulation program from said problem describing program for obtaining a solution of said partial differential equation which meets said boundary condition in said region of calculation.

5. A method for generating a simulation program according to claim 4, wherein said displaying step (a) further includes the step of repeating said step (a2) in response to input by the operator of a new program statement describing a new mathematical formula.

6. A method for generating a simulation program according to claim 4, wherein said displaying step (a) further includes the step of changing, in response to a selection by the operator of one of said displayed portion of said region of calculation and said displayed mathematical formula, a display characteristic of the other of said displayed portion of said region of calculation and said displayed mathematical formula.

7. A method for generating a program, by a computer, for simulating a physical phenomenon governed by a partial differential equation, comprising the steps of:

(a) graphically displaying information described by a string of program statements which forms part of a problem describing program and describes a partial differential equation to be solved, a region of calculation, and a boundary condition, the information being graphically displayed in response to input by an operator of said string of program statements, the step (a) including the sub-steps of:

(a1) displaying a shape of the region of calculation in response to program statements in the input string of program statements which describe the region of calculation, and (a2) detecting a selection by the operator of a position on a display screen at which a portion of said region of calculation is displayed as a program input of said portion of region of calculation, and (b) in response to input by the operator of another string of program statements necessary to complete said problem describing program, generating from said problem describing program a simulation program for obtaining a solution of said partial differential equation which meets said boundary condition in said region of calculation.

8. A method for generating a simulation program according to claim 7, wherein said displaying step (a) further includes the sub-step of:

(a3) displaying a mathematical formula relating to the portion of said region of calculation at a position corresponding to the display position of said portion of said region of calculation in response to a program statement in the input string of program statements which describes said mathematical formula.

9. A method for generating a program, by a computer, for simulating a physical phenomenon governed by a partial differential equation, comprising the steps of:

(a) in response to a problem describing program describing at least a region of calculation, a boundary condition, a partial differential equation to be solved, and a numerical calculation algorithm scheme, selecting one criterion for one numerical calculation algorithm scheme described by the problem describing program from a plurality of criteria stored in a database which are to be met when different numerical calculation algorithm schemes are used;

(b) determining whether said problem describing program meets said one criterion;

(c) requesting an operator to modify the problem describing program when said one criterion is not met; and (d) after modification of the problem describing program by the operator, generating from the modified problem describing program a simulation program for obtaining, in accordance with said one numerical calculation algorithm scheme, a solution of said partial differential equation in said region of calculation which meets said boundary condition.

10. A method for generating a simulation program according to claim 1, wherein said one criterion is a criterion relating to stability of a solution of said one numerical calculation algorithm scheme.

11. A method for generating a simulation program according to claim 1, wherein said one criterion is a criterion relating to convergence of a solution of said one numerical calculation algorithm scheme.

12. A method for generating a simulation program according to claim 1, wherein said selection step (a) includes the sub-steps of:

(a1) determining a structure of said one numerical calculation algorithm scheme, (a2) determining a type of said one numerical calculation algorithm scheme based on the determined structure of the one numerical calculation algorithm scheme, and (a3) selecting one of the stored criteria based on the determined type of the one numerical calculation algorithm scheme.

13. A method for generating a simulation program according to claim 9, further comprising the step of:

(e) determining a portion of said problem describing program which requires modification based on information in said database and indicating the determined portion to the operator.

14. A method for generating a simulation program according to claim 13, wherein said step (e) includes the sub-step of displaying said region of calculation such that one portion of said region of calculation is displayed in a different manner than other portions of said region of calculation when said determined portion of said problem describing program includes information relating to said one portion of said region of calculation.

15. A method for generating a program, by a computer, for simulating a physical phenomenon governed by a partial differential equation, comprising the steps of:

(a) based on a problem describing program describing a region of calculation, a boundary condition, and a partial differential equation to be solved, generating a first program portion for solving the partial differential equation as a first portion of a simulation program; and (b) generating, as a second portion of said simulation program, a second program portion which temporarily interrupts execution of said simulation program when processing requested by at least one program statement selected as a break point and included in said problem describing program is executed by said first program portion during execution of said simulation program, and which starts debug processing for diagnosing an execution result of the simulation program when the temporary interruption occurs.

16. A method for generating a simulation program according to claim 15, wherein said second program portion generating step (b) includes the sub-step of generating, as said second program portion, a program portion which effects the temporary interruption when the processing requested by said at least one program statements has been executed by said first program portion a designated number of times.

17. A method for generating a simulation program according to claim 15, further comprising the step of:
(c) generating, as a third portion of said simulation program, a third program portion requesting an operator to select, at a start of execution of said simulation program, at least one program statement as a break point from program statements included in the problem describing program.

18. A method for generating a simulation program according to claim 17, wherein said third program portion generating step (c) includes the sub-step of displaying at least a portion of the problem describing program and generating, as said third program portion, a program portion requesting the operator to select the at least one program statement.

19. A method for generating a simulation program according to claim 17, wherein said second program portion generating step (b) includes the sub-step of generating, as said third program portion, a plurality of control program portions each of which is provided for a respective program statement included in said problem describing program, and each of which temporarily interrupts execution of said simulation program and starts said debug processing when said third program portion detects that the respective program statement was selected as a break point by the operator at the start of execution of said simulation program and that processing requested by the respective program statement has been executed by said first program portion.

20. A method for generating a simulation program according to claim 17, wherein said third program portion generating step (c) includes the sub-step of generating, as said third program portion, a program portion requesting the operator to select, at the start of execution of said simulation program, at least one program statement as a break point and at least one program statement whose execution is to be omitted from the program statements included in the problem describing program, said method further comprising the step of:
(d) generating a fourth program portion which determines whether a particular program statement included in said problem describing program has been selected by the operator as a program statement whose execution is to be omitted before said first program portion executes processing requested by said particular program statement, and which modifies an execution of said third program portion so that said particular program statement is skipped if the particular program statement has been so selected by the operator.

21. A method for generating a simulation program according to claim 15, wherein said second program portion generating step (b) includes the sub-step of generating said second program portion for a program statement designated by a description in the problem describing program.

22. A method for generating a simulation program according to claim 15, further comprising the step of:
(c) generating a diagnosis program for said debug processing in response to a predetermined description in the problem describing program.

23. A method for generating a simulation program according to claim 22, wherein said diagnosis program includes a program for calculating a residual error of a solution of said partial differential equation at a precision designated by said problem describing program.

24. A method for debugging a program, by a computer, for simulating a physical phenomenon governed by a partial differential equation, comprising the steps of:
(a) generating a simulation program for solving said partial differential equation based on a problem describing program describing a region of calculation, a boundary condition, and the partial differential equation to be solved;
(b) executing said simulation program;
(c) in response to execution of a selected program statement included in said problem describing program, starting a debug processing which interrupts execution of said simulation program and which diagnoses an execution status of said simulation program when the interruption occurs;
(d) displaying a plurality of processing executable as a debug processing in response to the start of said debug processing;
(e) executing at least one of the displayed processing, the at least one displayed processing being selected by an operator; and
(f) resuming execution of said simulation program after execution of said at least one displayed processing.

25. A method for debugging a simulation program according to claim 24, wherein said plurality of displayed processing includes a processing for diagnosing a solution of said partial differential equation obtained at a time of the interruption, and a processing for diagnosing values of variables other than said solution at the time of the interruption.

26. A method for debugging a simulation program according to claim 24, wherein said plurality of displayed processings includes a processing for selecting a new program statement as a break point in the debug processing from a group of program statements included in said problem describing program.

27. A method for debugging a simulation program according to claim 24, further comprising the step of:
(g) repeating said steps (d) and (e).

28. A method for debugging a simulation program according to claim 24, further comprising the steps of:
(g) displaying said problem describing program during execution of said simulation program; and
(h) modifying the display of said problem describing program in accordance with the execution of said simulation program so that a displayed program statement included in said problem describing program which corresponds to a processing being simulated is displayed in a different manner than other displayed program statements included in the problem describing program which do not correspond to a processing being simulated.

29. A method for generating a program, by a computer, for simulating a physical phenomenon governed by a partial differential equation, comprising the steps of:
(a) in response to a problem describing program describing a region of calculation, a boundary condition, a first partial differential equation to be solved, and a name of an algorithm scheme to be used in solving said first partial differential equation, converting said first partial differential equation to a second partial differential equation suitable for serial solution in accordance with the algorithm scheme;
(b) adding to said problem describing program at least one declaration statement necessary for solving said second partial differential equation; and
(c) generating a simulation program for solving said second partial differential equation based on the problem describing program as modified in said steps (a) and (b).

30. A method for generating a simulation program according to claim 29, wherein said converting step (a) includes the step of selecting a plurality of variable names which are not used in said problem describing program as names of variables which are not used in said first partial differential equation but which are used in said second partial differential equation.

31. A method for generating a simulation program according to claim 29, wherein said converting step (a) includes the sub-step of selecting, based on said name in said problem describing program, one set including a second partial differential equation suitable for serial solution and at least one declaration statement from a plurality of sets each including a second partial differential equation suitable for serial solution and at least one declaration statement, and converting said first partial differential equation in said problem describing program to the second partial differential equation included in said one selected set; and wherein said adding step (b) includes the sub-step of adding the at least one declaration statement included in said one selected set to said problem describing program.

* * * * *